(12) United States Patent
Lam et al.

(10) Patent No.: US 11,662,815 B2
(45) Date of Patent: May 30, 2023

(54) APPARATUS, SYSTEM, AND METHOD FOR DETECTING USER INPUT VIA HAND GESTURES AND ARM MOVEMENTS

(71) Applicant: META PLATFORMS TECHNOLOGIES, LLC, Menlo Park, CA (US)

(72) Inventors: For Sander Lam, Bothell, WA (US); Xiangyu Kong, Shenzhen (CN)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/705,899

(22) Filed: Mar. 28, 2022

(65) Prior Publication Data

US 2023/0112539 A1  Apr. 13, 2023

Related U.S. Application Data

(60) Provisional application No. 63/253,667, filed on Oct. 8, 2021.

(51) Int. Cl.
*G06F 3/01* (2006.01)
*G02B 27/00* (2006.01)
*G06V 40/10* (2022.01)

(52) U.S. Cl.
CPC ......... *G06F 3/014* (2013.01); *G02B 27/0093* (2013.01); *G06F 3/015* (2013.01); *G06V 40/11* (2022.01)

(58) Field of Classification Search
CPC ..... G06F 3/014; G06F 3/015; G02B 27/0093; G06V 40/11
See application file for complete search history.

(56) References Cited

U.S. PATENT DOCUMENTS

| 11,442,550 | B2* | 9/2022 | Qiu | G01S 7/417 |
| 2014/0198035 | A1* | 7/2014 | Bailey | G06F 3/0484 345/156 |
| 2015/0199025 | A1* | 7/2015 | Holz | G06F 3/043 345/156 |
| 2018/0088673 | A1* | 3/2018 | Bhalla | G06F 3/0325 |
| 2020/0073483 | A1* | 3/2020 | Berenzweig | A61B 5/316 |

(Continued)

OTHER PUBLICATIONS

International Search Report and Written Opinion Report for International Application No. PCT/US2022/044648, dated Jan. 17, 2023, 10 pages.

*Primary Examiner* — Bryan Earles
(74) *Attorney, Agent, or Firm* — Greenberg Traurig, LLP

(57) ABSTRACT

An artificial-reality system comprising (1) a wearable dimensioned to be donned on a body part of a user, wherein the wearable comprises (A) a set of electrodes that detect one or more neuromuscular signals via the body part of the user and (B) a transmitter that transmits an electromagnetic signal, (2) a head-mounted display communicatively coupled to the wearable, wherein the head-mounted display comprises a set of receivers that receive the electromagnetic signal, and (3) one or more processing devices that (1) determine, based at least in part on the neuromuscular signals, that the user has made a specific gesture and (2) determine, based at least in part on the electromagnetic signal, a position of the body part of the user when the user made the specific gesture. Various other apparatuses, systems, and methods are also disclosed.

20 Claims, 18 Drawing Sheets

(56) References Cited

U.S. PATENT DOCUMENTS

| | | | |
|---|---|---|---|
| 2020/0319290 A1* | 10/2020 | Konttori | G01S 5/0284 |
| 2021/0064132 A1 | 3/2021 | Rubin et al. | |
| 2021/0349529 A1* | 11/2021 | Winold | A61B 5/1124 |
| 2022/0137204 A1* | 5/2022 | Nguyen | G06F 3/017 |
| | | | 342/28 |
| 2022/0196782 A1* | 6/2022 | Dawar | G01S 3/043 |
| 2022/0300082 A1* | 9/2022 | Shin | G06V 40/28 |

\* cited by examiner

Wearable 102

Implementation 400

APPARATUS, SYSTEM, AND METHOD FOR DETECTING USER INPUT VIA HAND GESTURES AND ARM MOVEMENTS

INCORPORATION BY REFERENCE

This application claims the benefit of priority under 35 U.S.C. § 119(e) to U.S. Provisional Application No. 63/253,667 filed Oct. 8, 2021, the contents of which are incorporated herein by reference in their entirety.

BRIEF DESCRIPTION OF DRAWINGS

The accompanying drawings illustrate a number of exemplary embodiments and are parts of the specification. Together with the following description, the drawings demonstrate and explain various principles of the instant disclosure.

Figure 1:
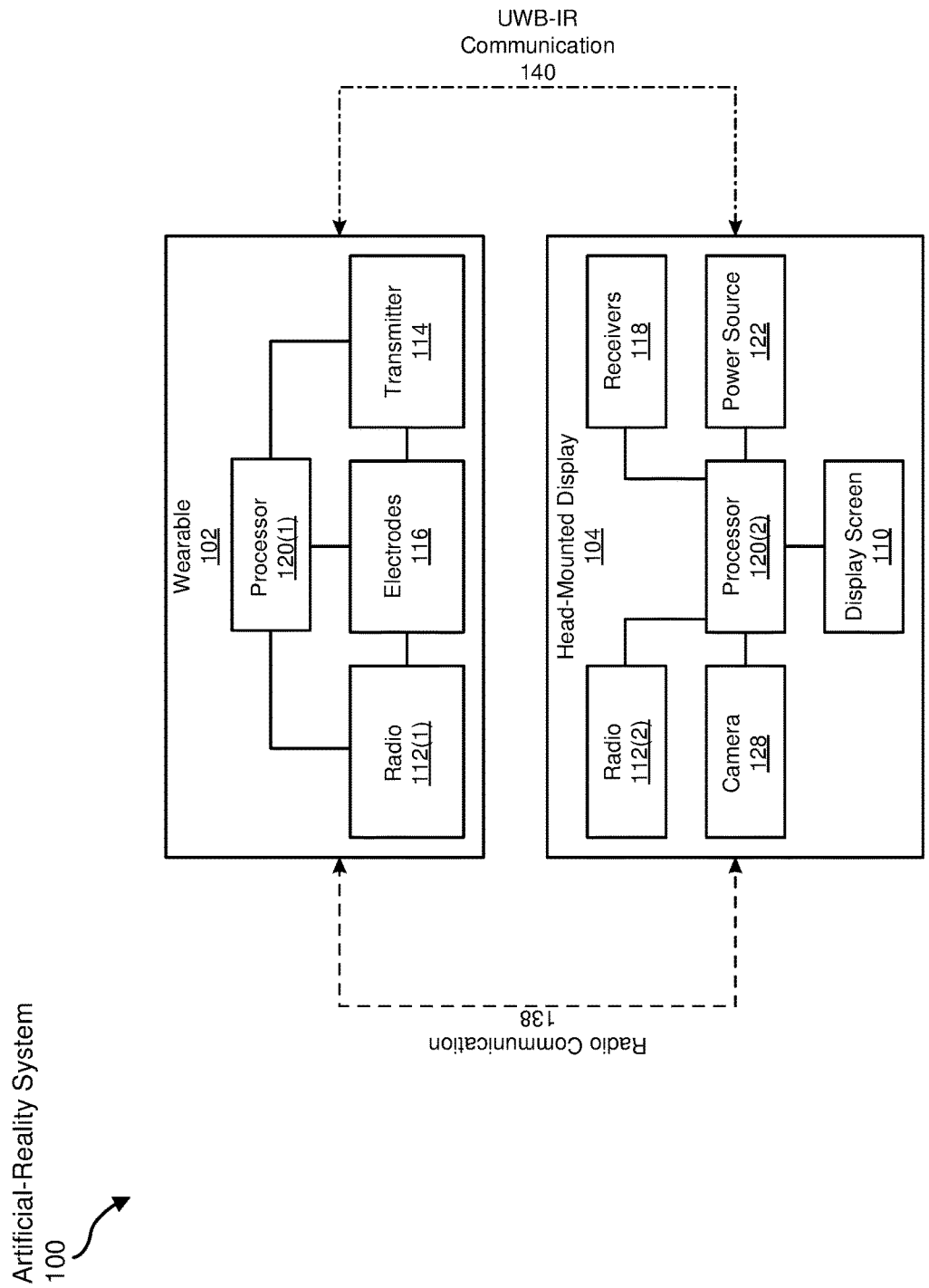
FIG. 1 is an illustration of an artificial-reality system for detecting user input via hand gestures and hand movements according to one or more embodiments of this disclosure.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, combinations, equivalents, and alternatives falling within this disclosure.

DETAILED DESCRIPTION

The present disclosure is generally directed to apparatuses, systems, and methods for detecting user input via hand gestures and arm movements. As will be explained in greater detail below, these apparatuses, systems, and methods may provide numerous features and benefits.

Artificial reality often provides a rich, immersive experience in which users are able to interact with virtual objects and/or environments in one way or another. In this context, artificial reality may constitute a form of reality that has been altered by virtual objects for presentation to a user. Such artificial reality may include and/or represent virtual reality, augmented reality, mixed reality, hybrid reality, or some combination and/or variation of one or more of the same.

Although artificial-reality systems are commonly implemented for gaming and other entertainment purposes, such systems are also implemented for purposes outside of recreation. For example, governments may use them for military training simulations, doctors may use them to practice surgery, engineers may use them as visualization aids, and co-workers may use them to facilitate inter-personal interactions and collaboration from across the globe.

Certain artificial-reality systems may incorporate hands-on controllers that enable users to enter input capable of modifying their artificial reality experiences. Unfortunately, these hands-on controllers may limit the users' mobility and/or movements, especially hand-based actions and/or gestures. To resolve these limitations, some artificial-reality systems may incorporate wearables capable of sensing a few motions, actions, and/or gestures made by users. The sensing of other motions, actions, and/or gestures, however, may prove challenging and/or impracticable via such wearables.

For example, some wearables may be unable to accurately detect and/or track the distance and/or location of a body part positioned proximate to a wearable. Additionally or alternatively, some wearables may be unable to translate the distance and/or location of such a body part into a virtual component presented to the user via a head-mounted display (e.g., augmented-reality glasses), much less controlling the head-mounted display via such a body part. The instant disclosure, therefore, identifies and addresses a need for additional systems and methods for detecting user input via hand gestures and arm movements.

As will be described in greater detail below, an artificial-reality system may include and/or represent a wearable (e.g., a wristband and/or watch) and/or a head-mounted display (e.g., augmented-reality glasses) that are communicatively coupled to one another. In one example, the wearable may be dimensioned to be donned on a body part (e.g., a wrist) of a user of the artificial reality system. In this example, the wearable may include and/or represent (1) a set of electrodes (e.g., EMG sensors) that detect one or more neuromuscular signals via the body part of the user and (2) a transmitter (e.g., an ultra-wideband radio) that transmits an electromagnetic signal.

In some examples, the head-mounted display may include and/or represent a set of receivers that receive the electromagnetic signal transmitted by the transmitter included on the wearable. In such examples, the artificial-reality system may include and/or represent one or more processing devices that (1) determine, based at least in part on the neuromuscular signals detected via the body part of the user, that the user has made a specific gesture and (2) determine, based at least in part on the electromagnetic signal received by the set of receivers included on the head-mounted display, a position of the body part of the user when the user made the specific gesture.

In some examples, at least one of the processing devices may be incorporated in the wearable. Additionally or alternatively, at least one of the processing devices may be incorporated in the head-mounted display.

In some examples, the user's hand gestures and/or arm movements may serve and/or operate as a user interface for the artificial-reality system. For example, the user's hand gestures and/or arm movements may generate control signals that are translated into commands for the artificial-reality system.

In some examples, the wearable may include and/or represent EMG sensors that detect and/or measure muscle activity and/or patterns. In one example, the artificial-reality system may include and/or represent Bluetooth radios that facilitate configuring and/or pairing the wearable and/or head-mounted display. Additionally or alternatively, the Bluetooth radios may transmit EMG data from the wearable to the head-mounted display.

In some examples, the wearable may include and/or represent one or more ultra-wideband impulse radios that provide and/or transmit precise timestamped impulse signals to the head-mounted display for angle-of-arrival calculations. In such examples, the head-mounted display may include and/or represent an array of ultra-wideband antennas (e.g., 2, 3, 4, or more antennas) that receive the impulse signals. The head-mounted display may identify and/or detect the times of arrival for the impulse signals as received by the ultra-wideband antennas. The head-mounted display may then calculate and/or compute the varying travel times of the impulse signals relative to the array of ultra-wideband antennas based at least in part on the times of arrival and the timestamps. In one example, the head-mounted display may then convert the times of arrival and/or the travel times for the impulse signals to an angle of arrival of the impulse signals, which correspond to and/or represent the location (e.g., a 2-dimensional and/or 3-dimensional representation) of the wearable within a defined field of view of the head-mounted display. In this example, the accuracy and/or precision of the angle of arrival may increase with the number of antennas included in the array. The head-mounted display may then generate a pointer and/or superimpose the same on top of an augmented-reality presentation provided to and/or viewed by the user.

In some examples, an ultra-wideband impulse radio incorporated in the wearable may wirelessly transmit precise timestamp data and/or EMG signal data to the array of ultra-wideband antennas incorporated in the head-mounted display. In these examples, if the wearable is located within the field of view of the head-mounted display, the head-mounted display may activate and/or generate a pointer and/or cursor for display and/or presentation to the user. In one example, the head-mounted display may determine hand gestures performed by the user based at least in part on the EMG signal data. In this example, the hand gestures may correspond to and/or represent commands and/or computer-readable instructions for the artificial-reality system.

In some examples, the head-mounted display may determine the proper 2-dimensional and/or 3-dimensional location or position of the pointer and/or cursor within the field of view based at least in part on the angle of arrival. By combining the EMG signal data and the angle-of-arrival data, the head-mounted display may be able to create a control mechanism and/or user interface that enables the user to control and/or interact with the virtual features displayed to the user without touching the head-mounted display or even the wearable.

The following will provide, with reference to FIGS. 1-10, detailed descriptions of exemplary devices, systems, components, and corresponding implementations for detecting user input via hand gestures and arm movements. In addition, detailed descriptions of methods for detecting user input via hand gestures and arm movements in connection with FIG. 11. The discussion corresponding to FIGS. 12-18 will provide detailed descriptions of types of exemplary artificial-reality devices, wearables, and/or associated systems that may support and/or contribute to detecting user input via hand gestures and arm movements.

FIG. 1 illustrates an exemplary artificial-reality system 100 that includes and/or represents a wearable 102 and/or a head-mounted display 104 capable of communicating with one another. As illustrated in FIG. 1, wearable 102 may include and/or represent a processor 120(1), a radio 112(1), a set of electrodes 116, and/or a transmitter 114. In some examples, head-mounted display 104 may include and/or represent a processor 120(2), a radio 112(2), a set of receivers 118, a camera 128, a display screen 110, and/or a power source 122.

In some examples, wearable 102 may refer to and/or represent any type or form of computing device that is worn as part of an article of clothing, an accessory, and/or an implant. In one example, wearable 102 may include and/or represent a wristband secured to and/or worn by the wrist of a user. Additional examples of wearable 102 include, without limitation, armbands, pendants, bracelets, rings, jewelry, ankle bands, clothing, smartwatches, electronic textiles, shoes, clips, headbands, gloves, variations or combinations of one or more of the same, and/or any other suitable wearable devices.

Figure 3:
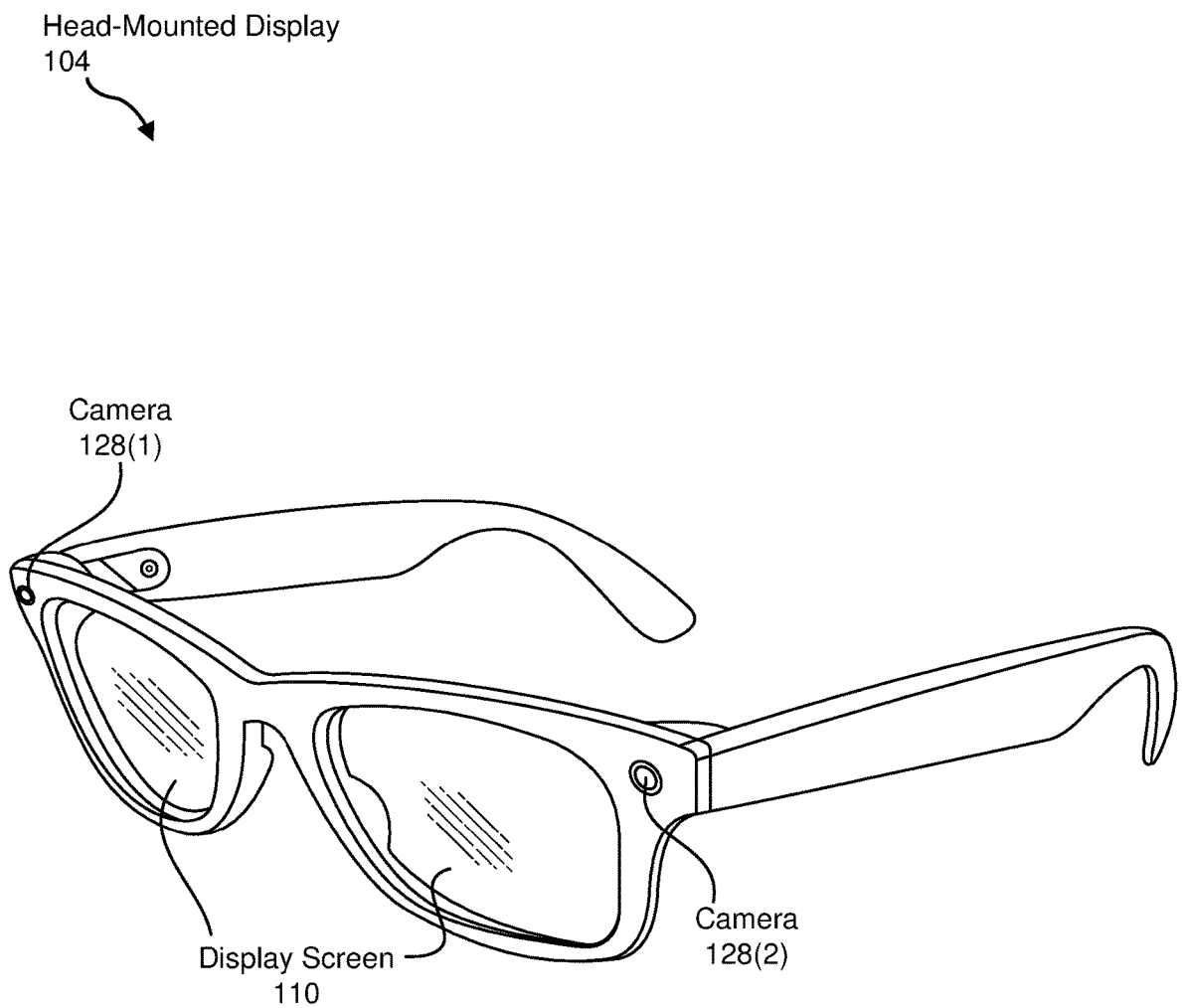
FIG. 3 is an illustration of an exemplary head-mounted display that facilitates detecting user input via hand gestures and hand movements according to one or more embodiments of this disclosure.

In some examples, head-mounted display 104 may refer to and/or represent any type of display and/or visual device that is worn on and/or mounted to a user's head or face. In one example, head-mounted display 104 may include and/or represent a pair of augmented reality (AR) glasses designed to be worn on and/or secured to a user's head or face. As illustrated in FIG. 3, head-mounted display 104 may include and/or incorporate display screen 110 as lenses and/or corresponding partially see-through components on such AR glasses. In this example, head-mounted display 104 may include and/or incorporate cameras 128(1) and 128(2) directed and/or aimed toward the user's line of sight and/or field of view. In another example, head-mounted display 104 may include and/or represent a virtual-reality headset and/or any other suitable type or form of artificial-reality headset.

In some examples, wearable 102 and/or head-mounted display 104 may achieve and/or establish one or more links, connections, and/or channels of communication with one another. For example, wearable 102 and head-mounted display 104 may be able to communicate with one another via transmitter 114 and receivers 118, respectively. In this example, transmitter 114 and receivers 118 may achieve, support, facilitate, and/or establish ultra-wideband impulse radio (UWB-IR) communication 140 between wearable 102 and head-mounted display 104. Additionally or alternatively, wearable 102 and head-mounted display 104 may be able to communicate with one another via radio 112(1) and radio 112(2), respectively. In this example, radio 112(1) and radio 112(2) may achieve, support, facilitate, and/or establish radio communication 138 (e.g., Bluetooth communication) between wearable 102 and head-mounted display 104.

Figure 2:
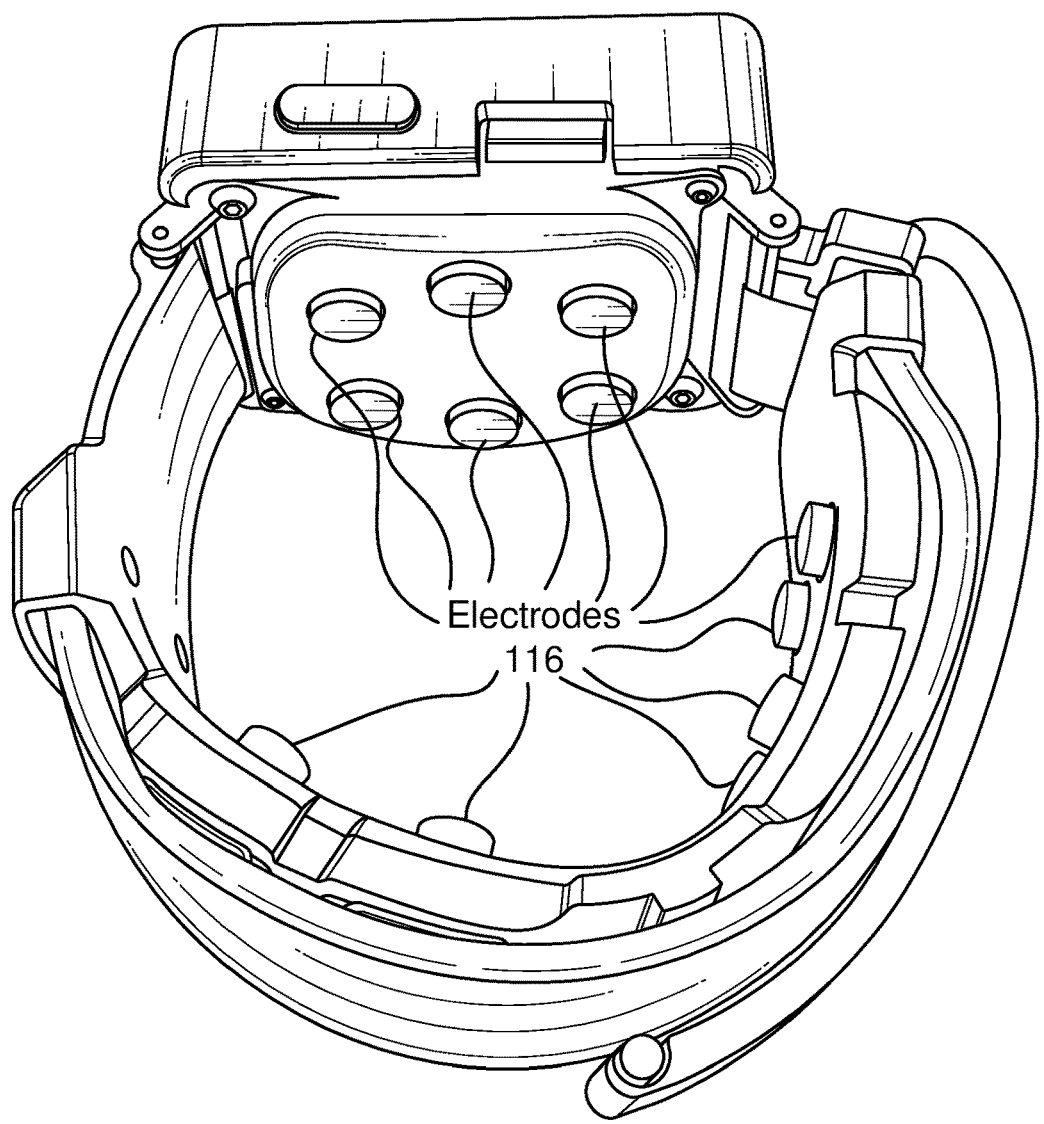
FIG. 2 is an illustration of an exemplary wearable that facilitates detecting user input via hand gestures and hand movements according to one or more embodiments of this disclosure.

In some examples, electrodes 116 may each constitute and/or represent any type or form of electrical conductor capable of detecting and/or sensing neuromuscular signals via a user's body. In one example, electrodes 116 may include and/or represent neuromuscular sensors and/or electromyography (EMG) sensors arranged, configured, and/or disposed circumferentially around wearable 102 as illustrated in FIG. 2. Additional examples of electrodes 116 include, without limitation, mechanomyography (MMG) sensors, sonomyography (SMG) sensors, combinations or variations of one or more of the same, and/or any other suitable electrodes. Any suitable number and/or arrangement of electrodes 116 may be applied to wearable 102.

In some examples, electrodes 116 may be communicatively coupled to one another and/or to processor 120(1) by flexible electronics, connectors, traces, and/or wiring. Additionally or alternatively, electrodes 116 may be integrated with and/or into an elastic band and/or wristband of wearable 102.

In some examples, electrodes 116 may be arranged in a specific and/or deliberate configuration across wearable 102. In one example, electrodes 116 may be separated and/or spaced from one another along wearable 102 by one or more known distances.

In some embodiments, the output of one or more of electrodes 116 may be processed, amplified, rectified, and/or filtered via hardware signal processing circuitry. Additionally or alternatively, the output of one or more of electrodes 116 may be processed, amplified, rectified, and/or filtered via signal processing software or firmware. Accordingly, the processing of neuromuscular signals may be performed in hardware, software, and/or firmware.

In some examples, one or more of processors 120(1) and 120(2) may include and/or represent any type or form of hardware-implemented processing device capable of interpreting and/or executing computer-readable instructions. In one example, processor 120(1) or 120(2) may access and/or modify certain software modules to facilitate and/or support detecting user input via hand gestures and/or arm movements. Examples of processors 120(1) and 120(2) include, without limitation, physical processors, Central Processing Units (CPUs), microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable processing device.

In some examples, wearable 102 may include and/or incorporate a wearable band. For example, wearable 102 may include and/or represent a strap and/or band designed and/or dimensioned to at least partially encompass the user's wrist and/or arm. The strap and/or band may include and/or contain a variety of different materials. Examples of such materials include, without limitation, cottons, polyesters, nylons, elastics, plastics, neoprene, rubbers, metals, woods, composites, combinations or variations of one or more of the same, and/or any other suitable materials. The strap and/or band may be defined and/or formed in a variety of shapes and/or sizes with the aim of securing wearable 102 to the user's wrist and/or arm. In one example, the strap and/or band may include and/or represent one or more segments, links, and/or sections. Additionally or alternatively, the strap and/or band may be adjustable to provide a one-size-fits-most feature.

In some examples, wearable 102 and/or head-mounted display 104 may include and/or represent one or more additional components, devices, and/or mechanisms that are not necessarily illustrated and/or labelled in FIG. 1. For example, wearable 102 and/or head-mounted display 104 may include and/or represent one or more memory devices that are not necessarily illustrated and/or labelled in FIG. 1. Such memory devices may include and/or store computer-executable instructions that, when executed by processor 120(1) or 120(2), cause processor 120(1) or 120(2) to perform one or more tasks directed to detecting user input via hand gestures and arm movements. Additionally or alternatively, although not necessarily illustrated and/or labelled in this way in FIG. 1, wearable 102 and/or head-mounted display 104 may include and/or represent circuitry, transistors, resistors, capacitors, diodes, transceivers, sockets, wiring, circuit boards, additional processors, and/or additional memory devices, batteries, cabling, and/or connectors, among other components.

In some examples, such memory devices may include and/or represent any type or form of volatile or non-volatile storage device or medium capable of storing data and/or computer-readable instructions. In one example, such memory devices may store, load, and/or maintain one or more modules and/or trained inferential models that perform certain tasks, classifications, and/or determinations in connection with localizing motor unit action potential to facilitate spike decomposition and stable representation. Examples of memory 108 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

In some, wearable 102 and/or head-mounted display 104 may exclude and/or omit one or more of the components, devices, and/or mechanisms that are illustrated and/or labelled in FIG. 1. For example, wearable 102 and/or head-mounted display 104 may exclude and/or omit radio 112(1) or radio 112(2), respectively. In this example, UWB-IR communication 140 between wearable 102 and head-mounted display 104 may still be available and/or provided via transmitter 114 and receivers 118.

In some examples, when wearable 102 is worn by the user, electrodes 116 may interface and/or make physical contact with the user's skin. In one example, wearable 102 may be communicatively coupled to a computing system (such as a virtual reality headset, an augmented reality headset, a laptop, a desktop, a smart television, a monitor, etc.). In this example, the user may put and/or place his or her body in a certain state and/or condition (such as a hand gesture) to control and/or modify the presentation or performance of the computing system. As the user puts and/or places his or her body in that state and/or condition, the user's body may generate and/or produce neuromuscular signals representative, indicative, and/or suggestive of that state or condition.

In some examples, the neuromuscular signals may traverse and/or travel through the user's body. For example, the user may make a pose and/or gesture that generates neuromuscular signals that traverse down his or her arm toward the hand. In one example, one or more of electrodes 116 may detect and/or sense the neuromuscular signals as they traverse down the arm toward the hand. Electrical conductors (e.g., wiring and/or traces) coupled between those electrodes and processor 120(1) may carry and/or pass such signals and/or their derivatives to processor 120(1). Processor 120(1) may then generate and/or produce data representative of those signals.

In some examples, the data representative of those signals may undergo certain processing and/or conversions. Examples of such data include, without limitation, raw data produced and/or output by electrodes, digital conversions and/or representations of analog signals output by electrodes, processed digital representations of signals output by electrodes, combinations or variations of one or more of the same, and/or any other suitable version of data representative of neuromuscular signals.

In this example, processor 120(1) or 120(2) may analyze and/or evaluate the data representative of the neuromuscular signals to localize motor unit action potential and/or facilitate spike decomposition or stable representation. For example, processor 120(1) or 120(2) may execute and/or implement one or more software models and/or trained inferential models or classifiers. Processor 120(1) or 120(2) may input and/or feed the data representative of the neuromuscular signals to one or more of the software modules and/or inferential models. From that data, such software modules and/or inferential models may be able to output and/or produce a classification that identifies and/or indicates one or more motor units responsible for certain spikes in the neuromuscular signals. Additionally or alternatively, such software modules and/or inferential models may be able to determine, based at least in part on those motor units, that the user has made a specific gesture with at least one part of the user's body (using, e.g., a K-Nearest Neighbors (KNN) classifier).

In some examples, radios 112(1) and 112(2) may each include and/or represent a Bluetooth radio and/or a Bluetooth Low Energy radio. Additionally or alternatively, transmitter 114 and/or receivers 118 may each include and/or represent one or more UWB-IR devices. In one example, transmitter 114 and/or receivers 118 may each be included in and/or represent part of a transceiver that facilitates and/or supports UWB-IR communications, links, and/or channels. Additional examples of transmitter 114, receivers 118, and/or radios 112(1)-(2) include, without limitation, WiFi devices, cellular communication devices, Bluetooth radios, Bluetooth Low Energy radios, UWB devices, impulse radios, combinations or variations of one or more of the same, and/or any other suitable wireless communications devices.

In some examples, wearable 102 and head-mounted display 104 may exchange configuration and/or synchronization data with one another via radios 112(1) and 112(2). For example, wearable 102 may send and/or transmit configuration and/or synchronization data to head-mounted display 104 via radios 112(1) and 112(2). Additionally or alternatively, head-mounted display 104 may send and/or transmit configuration and/or synchronization data to wearable 102 via radios 112(2) and 112(1). In these examples, processor 120(1) and/or processor 120(2) may use the configuration and/or synchronization data to configure wearable 102 and/or head-mounted display 104, respectively, and/or to synchronize wearable 102 and/or head-mounted display 104 to one another. In another example, wearable 102 may send and/or transmit data about the neuromuscular signals detected via the body part of the user to head-mounted display 104 via radios 112(1) and 112(2).

In some examples, wearable 102 may be dimensioned to be donned on a body part of a user. In such examples, electrodes 116 included on wearable 102 may detect, sense, and/or conduct one or more neuromuscular signals via the body part of the user. In one example, transmitter 114 incorporated into wearable 102 may emit, send, and/or transmit an electromagnetic signal (e.g., a UWB-IR signal) to receivers 118 incorporated into head-mounted display 104. In this example, receivers 118 incorporated into head-mounted display 104 may receive and/or detect the electromagnetic signal transmitted by transmitter 114.

In some examples, processor 120(1) or 120(2) may determine that the user has made a specific gesture and/or arm movement based at least in part on the neuromuscular signals detected via the body part of the user. In one example, the specific gesture made by the user may include and/or represent a pinching action and/or pose. In this example, the pinching action and/or pose may involve one of the user's fingers (e.g., index, middle, ring, and/or pinky fingers) pressing and/or holding against the user's thumb. Additional examples of such gestures include, without limitation, fist actions or poses, wrist actions or motions, open-hand actions or poses, alternative pinches or poses, hand or arm motions, combinations or variations of one or more of the same, and/or any other suitable gestures.

In some examples, certain gestures and/or motions may be mapped to different input commands for head-mounted display 104. In one example, a gesture may be mapped to a certain input command such that, when the user executes and/or performs the gesture, wearable 102 or head-mounted display 104 causes an application running on head-mounted display 104 to click, select, and/or modify one or more features (such as virtual components presented by head-mounted display 104). Additionally or alternatively, the input command may be triggered and/or initiated in response to the user holding and/or performing the gesture for a predetermined duration.

In some examples, processor 120(2) may determine a position of the body part of the user when the user made the specific gesture based at least in part on the electromagnetic signal received by receivers 118. For example, as a UWB-IR device, transmitter 114 may apply and/or incorporate a time stamp into a UWB-IR signal transmitted to receivers 118. In this example, the UWB-IR signal may reach and/or arrive at receivers 118 at different times relative to one another.

In some examples, processor 120(2) may identify and/or determine a first time of arrival for the UWB-IR signal as the UWB-IR signal reaches and/or arrives at a first receiver included in receivers 118. In such examples, processor 120(2) may identify and/or determine a second time of arrival for the UWB-IR signal as the UWB-IR signal reaches and/or arrives at a second receiver included in receivers 118.

Accordingly, the first and second times of arrival may reference and/or correspond to the first and second receivers, respectively.

In one example, processor 120(2) may calculate and/or compute an angle of arrival for the UWB-IR signal relative to receivers 118 based at least in part on the first and second times of arrival and the time stamp. For example, processor 120(2) may subtract the time identified in the time stamp from the varying times of arrival for the UWB-IR signal as received by receivers 118. The resolution and/or accuracy of this calculation may increase and/or improve with the number of receivers involved. Accordingly, processor 120(2) may calculate and/or compute a more accurate and/or precise angle of arrival for the UWB-IR signal relative to receivers 118 by accounting for the times of arrival relative to 3 or 4 different receivers incorporated into head-mounted display 104.

In some examples, processor 120(2) may calculate and/or compute at least one dimension for a position of a virtual component within the field of view of head-mounted display 104 based at least in part on the angle of arrival. In one example, processor 120(2) may present and/or display the virtual component at the position within the field of view of the head-mounted display 104 based at least in part on the dimension. For example, processor 120(2) may cause and/or direct head-mounted display 104 to present a cursor and/or pointer at a certain position and/or location within the field of view of display screen 110 based at least in part of the dimension. Additionally or alternatively, processor 120(2) may cause and/or direct head-mounted display 104 to superimpose and/or overlay the cursor and/or pointer on or atop display screen 110 according to the dimension. In certain examples, processor 120(2) may also cause and/or direct head-mounted display 104 to select, open, and/or modify another virtual component presented proximate to the cursor and/or pointer on display screen 110 to account for one or more gestures made by the user.

In some examples, the dimension calculated and/or computed for the position of the virtual component may constitute and/or represent an azimuth, an elevation, and/or a depth for the virtual component to be presented within the field of view of head-mounted display. Additionally or alternatively, processor 120(2) may determine a size, an orientation, and/or a shape of the virtual component based at least in part on the dimension and/or the position.

In some examples, processor 120(2) may detect, sense, and/or determine a first phase of the UWB-IR signal as the UWB-IR signal reaches and/or arrives at the first receiver included in receivers 118. In such examples, processor 120(2) may detect, sense, and/or determine a second phase of the UWB-IR signal as the UWB-IR signal reaches and/or arrives at the second receiver included in receivers 118. Accordingly, the first and second phases of the UWB-IR signal may reference and/or correspond to the first and second receivers, respectively. In one example, the first and second phases of the UWB-IR signal may reference and/or be relative to one another.

In one example, processor 120(2) may calculate and/or compute an angle of arrival for the UWB-IR signal relative to receivers 118 based at least in part on the difference between the first and second phases of the UWB-IR signal and/or the time stamp. The resolution and/or accuracy of this calculation may increase and/or improve with the number of receivers involved. Accordingly, processor 120(2) may calculate and/or compute a more accurate and/or precise angle of arrival for the UWB-IR signal relative to receivers 118 by accounting for the phases of the UWB-IR signal relative to 3 or 4 different receivers incorporated into head-mounted display 104.

In some examples, processor 120(2) may calculate and/or compute a two-dimensional (2D) and/or three-dimensional (3D) position of a virtual component within the field of view of head-mounted display 104 based at least in part on the angle of arrival and/or the phase of the UWB-IR signal. In one example, processor 120(2) may present and/or display the virtual component at the 2D and/or 3D position within the field of view of the head-mounted display 104. For example, processor 120(2) may cause and/or direct head-mounted display 104 to present a cursor and/or pointer at the 2D and/or 3D position within the field of view of display screen 110. Additionally or alternatively, processor 120(2) may cause and/or direct head-mounted display 104 to superimpose and/or overlay the cursor and/or pointer on or atop display screen 110 at the 2D and/or 3D position.

In some examples, the 2D and/or 3D position of the virtual component may include, involve, and/or account for an azimuth, an elevation, and/or a depth of the virtual component as presented within the field of view of head-mounted display 104. Additionally or alternatively, processor 120(2) may determine a size, an orientation, and/or a shape of the virtual component based at least in part on the 2D and/or 3D position.

In some examples, the user may move wearable 102 and/or a corresponding body part from the field of view of head-mounted display 104. In one example, processor 120(2) may detect, sense, and/or determine that wearable 102 is no longer visible within the field of view of the head-mounted display 104. In response to this determination, processor 120(2) may remove the virtual component representing and/or corresponding to wearable 102 or the body part from the field of view of the head-mounted display 104. For example, processor 120(2) may cause and/or direct head-mounted display 104 to make the cursor and/or pointer disappear from the field of view of display screen 110.

In some examples, the user may don and/or wear multiple instances of wearable 102, and all these instances of wearable 102 may be communicatively coupled to head-mounted display 104. For example, the user may don and/or wear one wristband on the right wrist and another wristband on the left wrist. In this example, the right wristband and the left wristband may both transmit UWB-IR signals to head-mounted display 104.

In some examples, all instances of wearable 102 may perform any of the operations and/or functions described above in connection with FIG. 1. For example, the right wristband may detect and/or sense neuromuscular signals via the right wrist, and the left wristband may detect and/or sense neuromuscular signals via the left wrist. In this example, head-mounted display 104 may determine that the user made one gesture with the right hand based on the neuromuscular signals detected via the right wrist. Similarly, head-mounted display 104 may determine that the user made another gesture with the left hand based on the neuromuscular signals detected via the left wrist.

In some examples, head-mounted display 104 may determine a position of the right wristband and/or a corresponding body part when the user performed the gesture with the right hand based at least in part on the UWB-IR signal transmitted by the right wristband. Similarly, head-mounted display 104 may determine a position of the left wristband and/or a corresponding body part when the user performed the gesture with the left hand based at least in part on the UWB-IR signal transmitted by the left wristband.

In some examples, head-mounted display 104 may calculate and/or compute positions of virtual components within the field of view of display screen 110 based at least in part on the angles of arrival of the UWB-IR signals transmitted by the right wristband and left wristband. In one example, head-mounted display 104 may present and/or display the virtual components at those positions within the field of view of display screen 110. For example, head-mounted display 104 may cause and/or direct display screen 110 to superimpose and/or overlay a cursor and/or pointer corresponding to the right hand and another cursor and/or pointer corresponding to the left hand. In certain examples, head-mounted display 104 may also cause and/or direct one or more of those cursors or pointers to select, open, and/or modify another virtual component presented on display screen 110 to account for one or more gestures made by the user's right hand and/or left hand. Those cursors and/or pointers may appear and/or be presented on display screen 110 simultaneously.

Figure 4:
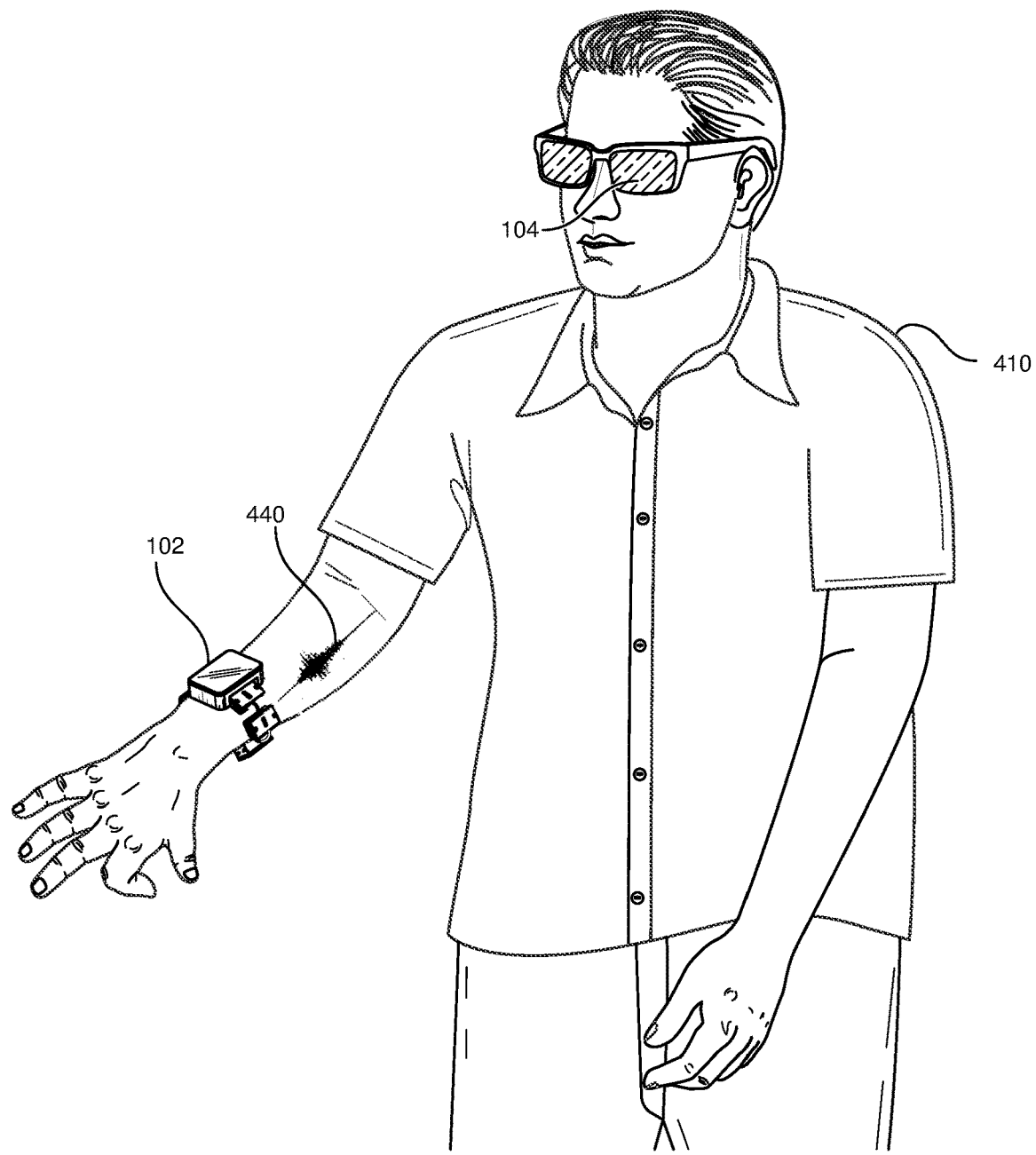
FIG. 4 is an illustration of an exemplary implementation of an artificial-reality system for detecting user input via hand gestures and arm movements according to one or more embodiments of this disclosure.

FIG. 4 is an illustration of an exemplary implementation 400 of artificial-reality system 100 for detecting user input via hand gestures and arm movements. In some examples, implementation 400 may include and/or involve a user 410 donning and/or operating wearable 102. In such examples, wearable 102 may localize motor unit action potential to facilitate spike decomposition and stable representation. In one example, wearable 102 may detect and/or sense neuromuscular signals 440 traversing the body of user 410 via electrodes 116. Wearable 102 may then translate the neuromuscular signals from a time-domain representation into a frequency-domain representation and/or a spatial-domain representation for further processing.

In some examples, wearable 102 may identify, within the portion of the body of user 410, a motor unit responsible for the spike in neuromuscular signals 440 by decomposing the spike in neuromuscular signals 440. In one example, a motor unit may include and/or represent a motor neuron and/or skeletal muscle fibers that are innervated by the motor neuron's axonal terminals. For example, a motor unit may include and/or represent a motor neuron along with all the muscle fibers stimulated by the motor neuron.

In some examples, wearable 102 may determine that the user has made a specific gesture with at least one body part based at least in part on the motor unit responsible for the spike in neuromuscular signals 440. For example, wearable 102 may process neuromuscular signals 440 as translated into the frequency-domain representation via a machine-learning classifier (e.g., a KNN classifier). In this example, wearable 102 may detect a spike pattern indicative of the specific gesture via the machine-learning classifier and then determine that the user made the specific gesture based at least in part on the spike pattern. Additionally or alternatively, wearable 102 may then direct head-mounted display 104 to manipulate and/or alter one or more audio and/or visual elements presented via head-mounted display 104 to account for the specific gesture made by the user.

Figure 5:
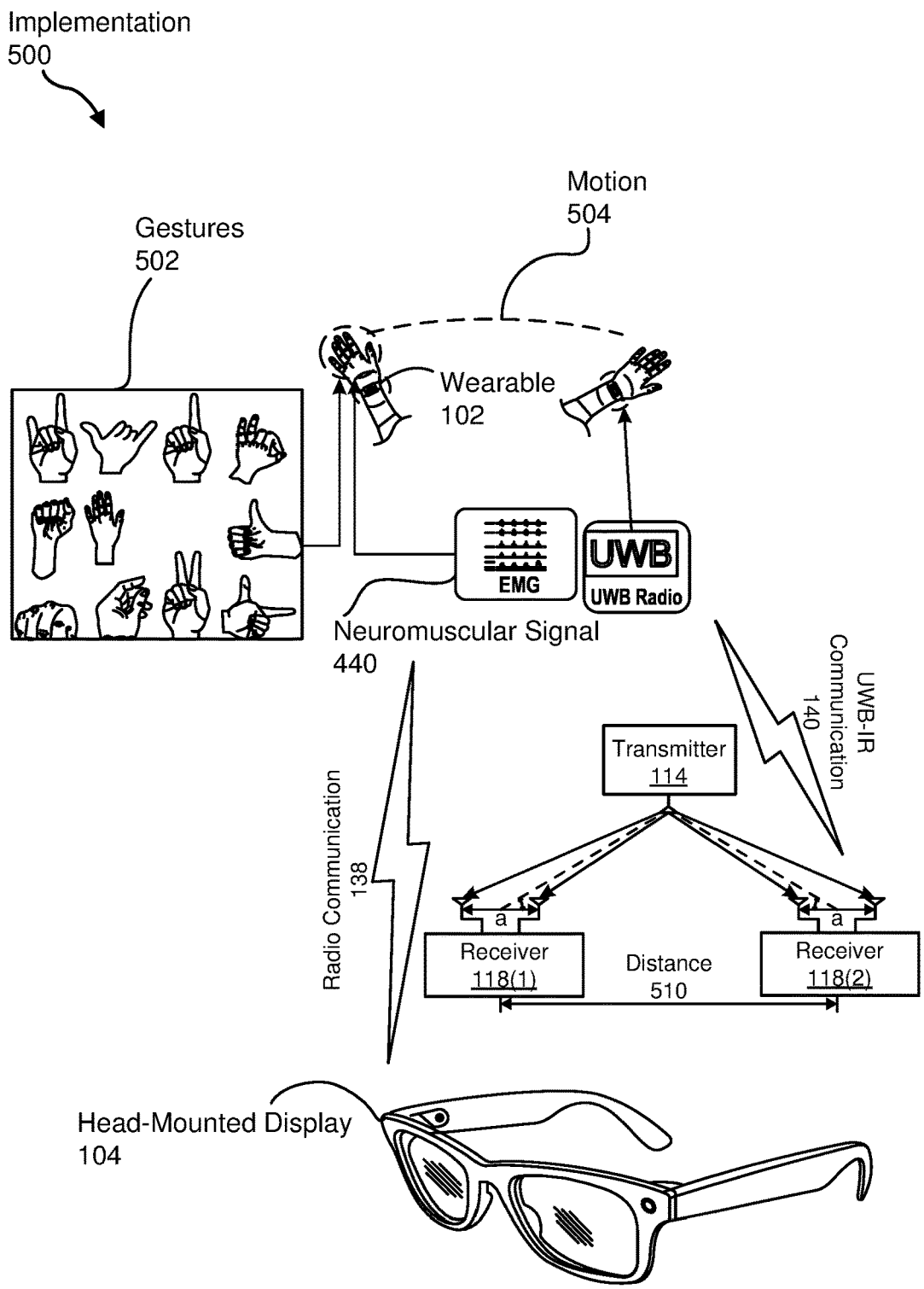
FIG. 5 is an illustration of an exemplary implementation of an artificial-reality system for detecting user input via hand gestures and arm movements according to one or more embodiments of this disclosure.

FIG. 5 illustrates an exemplary implementation 500 of artificial-reality system 100 for detecting user input via hand gestures and arm movements. In some examples, implementation 500 may include and/or involve a user donning and/or operating wearable 102. In such examples, wearable 102 may detect and/or sense neuromuscular signals 440 traversing the body of the user via electrodes 116. In one example, wearable 102 may then translate neuromuscular signals 440 from a time-domain representation into a frequency-domain representation to facilitate and/or support detecting and/or identifying gestures 502 and/or motion 504.

In some examples, wearable 102 may detect and/or identify one or more of gestures 502 and/or motion 504 based at least in part on neuromuscular signals 440. In such examples, wearable 102 may send and/or transmit information or data indicating that the user performed one or more of gestures 502 and/or motion 504 to head-mounted display 104 via radio communication 138 and/or UWB-IR communication 140.

In other examples, wearable 102 may send and/or transmit information or data representative of neuromuscular signals 440 to head-mounted display 104 via radio communication 138 or UWB-IR communication 140. In such examples, head-mounted display 104 may detect and/or identify one or more of gestures 502 and/or motion 504 based at least in part on the information or data representative of neuromuscular signals 440.

In some examples, processor 120(1) and/or transmitter 114 incorporated in wearable 102 may tag a UWB-IR signal with a time stamp. In such examples, transmitter 114 may send and/or transmit the tagged UWB-IR signal to the set of receivers 118 incorporated in head-mounted display 104 via UWB-IR communication 140. For example, the tagged UWB-IR signal may reach and/or arrive at both receivers 118(1) and 118(2), which are positioned at a distance 510 from one another. In this example, head-mounted display 104 may calculate and/or compute the angle of arrival and/or the phase difference of arrival for the tagged UWB-IR signal relative to receivers 118(1) and 118(2) based at least in part on the time stamp.

Figure 8:
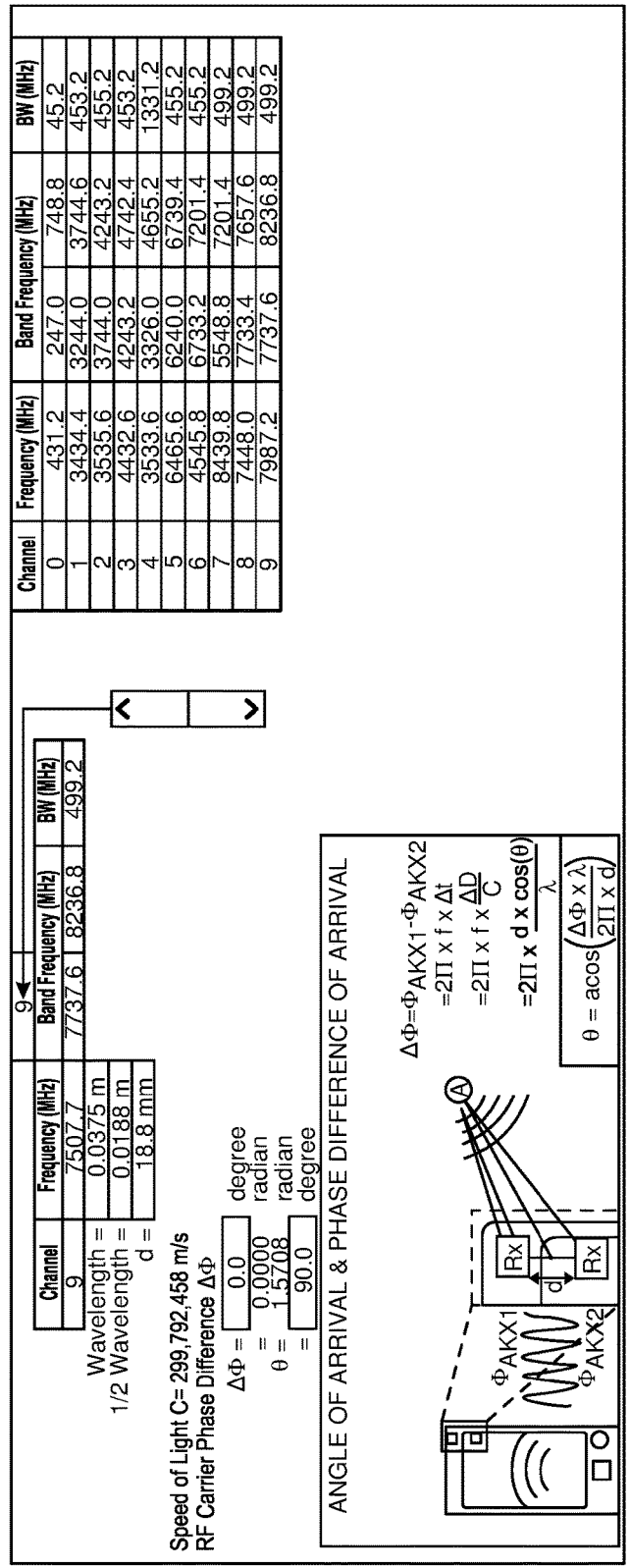
FIG. 8 is an illustration of an exemplary angle-of-arrival calculation for determining user input entered via hand gestures and arm movements according to one or more embodiments of this disclosure.

In some examples, head-mounted display 104 may perform an angle-of-arrival calculation 800 in FIG. 8 to determine and/or estimate a position for a virtual component (e.g., a pointer and/or cursor) superimposed over display screen 110. As a specific example, head-mounted display 104 may calculate and/or compute the RF carrier phase difference by applying the following formula:

$$\Delta \varphi = \varphi_{Rx118(1)} - \varphi_{Rx118(2)} = 2\pi(f \times \Delta t) = 2\pi\left(f \times \frac{\Delta D}{c}\right) = 2\pi\left(\frac{d \times \cos\theta}{\lambda}\right),$$

where $\varphi_{Rx118(1)}$ represents the phase of the carrier signal relative to receiver 118(1), $\varphi_{Rx118(2)}$ represents the phase of the carrier signal relative to receiver 118(2), f represents the frequency of the carrier signal, $\Delta t$ represents the travel time or time of arrival for the carrier signal between transmitter 114 and the corresponding receiver, $\Delta D$ represents the distance between transmitter 114 and the corresponding receiver, c represents the speed of light, d represents the known distance between receivers 118(1) and 118(2), $\theta$ represents the angle of arrival of the carrier signal relative to receivers 118(1) and 118(2), and $\lambda$ represents the wavelength of the carrier signal. Additionally or alternatively, head-mounted display 104 may calculate and/or compute the angle of arrival of the carrier signal relative to receivers 118(1) and 118(2) by applying the following formula:

$$\theta = \operatorname{acos}\left(\frac{\Delta\varphi \times \lambda}{2\pi \times d}\right).$$

In one example, the angle of arrival of the carrier signal may constitute and/or represent the direction from which the carrier is received relative to receivers 118(1) and 118(2).

In some examples, $\varphi$ and $\theta$ may correspond to and/or represent the azimuth and elevation, respectively, of wearable 102 and/or the virtual component within the field of view. For example, the φ calculation may translate and/or convert to the azimuth of the virtual component (e.g., a pointer and/or cursor) to be presented within a spherical coordinate system of head-mounted display 104. In this example, the θ calculation may translate and/or convert to the elevation of the virtual component to be presented within a spherical coordinate system of head-mounted display 104.

In some examples, head-mounted display 104 may calculate and/or compute the travel time and/or the time of arrival for the carrier signal between transmitter 114 and receivers 118(1) and 118(2). For example, processor 120(2) incorporated in head-mounted display 104 may identify and/or detect the time stamp tagged to the UWB-IR signal. In this example, processor 120(2) may also identify and/or detect the times of arrival of the carrier signal as received by receiver 118(1) and/or receiver 118(2). In one example, processor 120(2) may determine travel times and/or time deltas for the carrier signal by subtracting the time identified in the time stamp from the times of arrival. Processor 120(2) may then calculate and/or compute the angle of arrival for the carrier signal relative to receivers 118(1) and 118(2) based at least in part on the travel times and/or time deltas.

In some examples, the angle of arrival for the carrier signal may correspond to and/or represent the location (e.g., a 2D and/or 3D representation) of the wearable and/or an associated body part within the field of view of head-mounted display 104. In such examples, head-mounted display 104 may generate a virtual component (e.g., a pointer and/or cursor) that represents the wearable and/or the associated body for presentation and/or overlay on display screen 110 of head-mounted display 104. Head-mounted display 104 may convert and/or translate the angle of arrival for the carrier signal into a location (represented, e.g., as an azimuth and/or an elevation) for the corresponding coordinate system and/or grid of display screen 110. In one example, the virtual component may be visually combined (in, e.g., an augmented-reality environment or scenario) with one or more real components that are visible through display screen 110.

Figure 6:
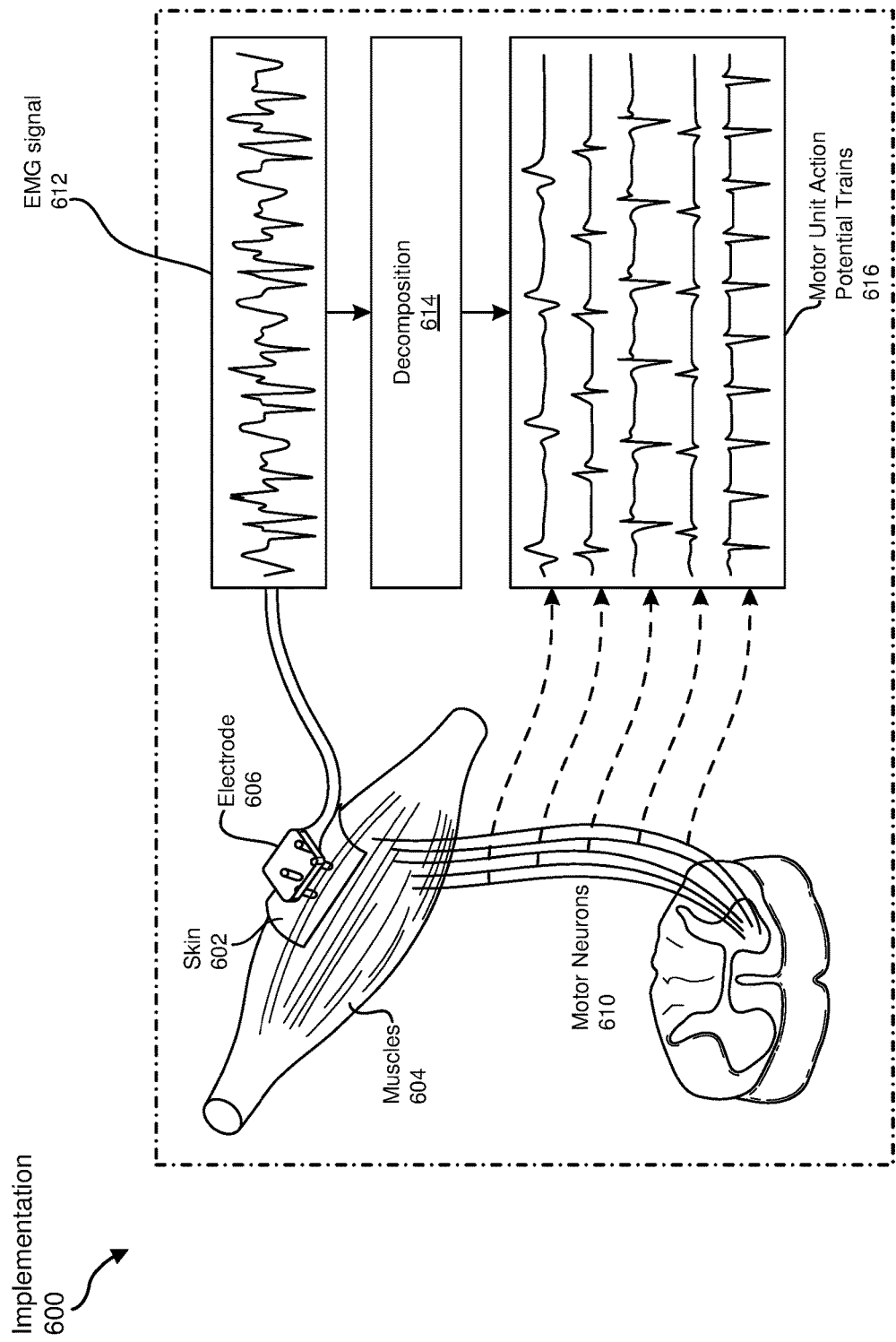
FIG. 6 is an illustration of an exemplary implementation of a wearable that facilitates detecting user input via hand gestures and arm movements according to one or more embodiments of this disclosure.

FIG. 6 illustrates an exemplary implementation 600 of artificial-reality system 100 for detecting user input via hand gestures and arm movements. In some examples, implementation 600 may include and/or involve a user donning and/or operating wearable 102 on skin 602. In such examples, wearable 102 may include and/or represent an electrode 606 coupled to skin 602. In one example, an EMG signal 612 may traverse and/or travel through muscles 604 of the user's body.

In some examples, electrode 606 may detect and/or sense EMG signal 612 traversing muscles 604 of the user's body via skin 602. In one example, wearable 102 and/or head-mounted display 104 may then translate and/or convert EMG signal 612 from a time-domain representation into a frequency-domain representation and/or a spatial-domain representation to facilitate and/or support detecting and/or identifying one or more of gestures 502 and/or motion 504.

In some examples, wearable 102 and/or head-mounted display 104 may resolve and/or decompose such EMG signals as represented in the time domain. For example, wearable 102 and/or head-mounted display 104 may perform a decomposition 614 of EMG signal 612 into motor unit action potential trains 616 representative of individual motor neurons 610 that innervate muscles 604 in the user's body. Wearable 102 and/or head-mounted display 104 may determine that the user performed one or more of gestures 502 and/or motion 504 based at least in part on certain patterns and/or spikes identified and/or detected in motor unit action potential trains 616.

Figure 7:
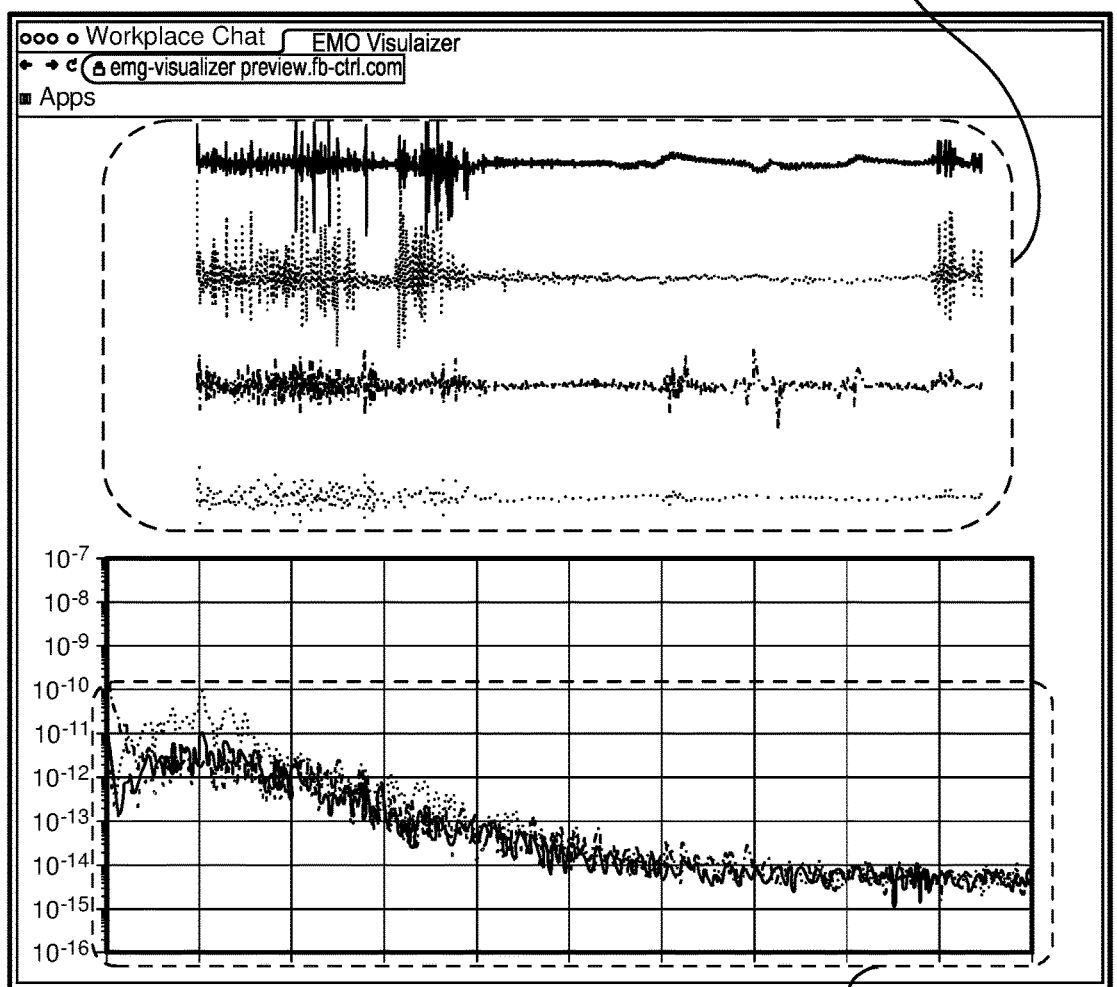
FIG. 7 is an illustration of exemplary neuromuscular signals detected by a wearable in connection with user input entered via hand gestures and arm movements according to one or more embodiments of this disclosure.

FIG. 7 illustrates exemplary representations of neuromuscular signals 700 detected and/or identified via wearable 102 donned by a user operating artificial-reality system 100. In some examples, neuromuscular signals 700 may include and/or represent raw time-domain EMG signals 702 detected via electrodes 116 arranged and/or disposed on wearable 102. In one example, wearable 102 and/or head-mounted display 104 may process, translate, and/or convert raw time-domain EMG signals 702 into processed frequency-domain EMG signals 704. In this example, wearable 102 and/or head-mounted display 104 may determine that the user performed one or more of gestures 502 and/or motion 504 based at least in part on certain patterns and/or spikes identified and/or detected in raw time-domain EMG signals 702 and/or processed frequency-domain EMG signals 704.

Figure 9:
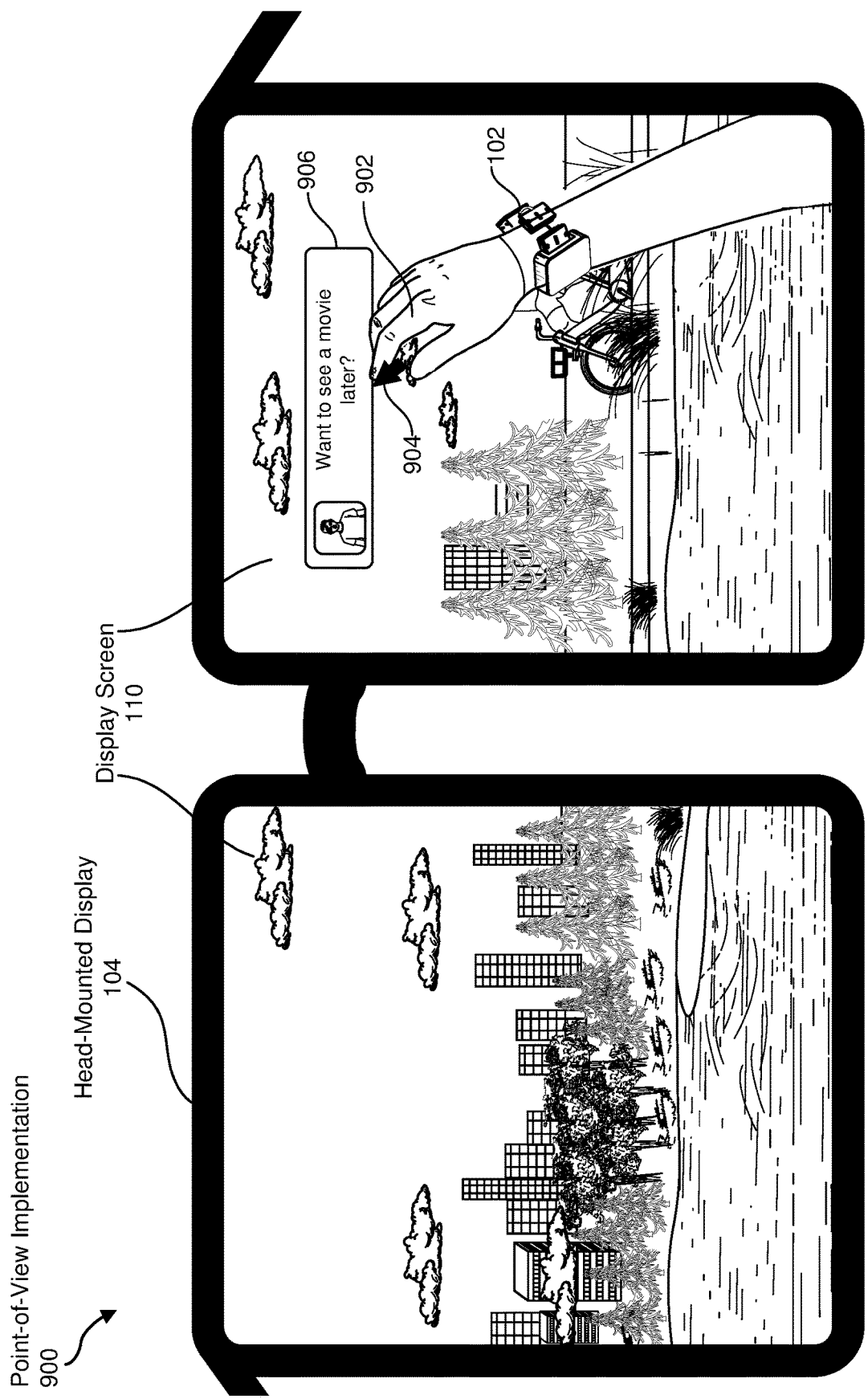
FIG. 9 is an illustration of an exemplary point-of-view implementation of an artificial-reality system for detecting user input via hand gestures and arm movements according to one or more embodiments of this disclosure.

FIG. 9 illustrates an exemplary point-of-view implementation 900 of artificial-reality system 100. As illustrated in FIG. 9, exemplary point-of-view implementation 900 may include and/or represent a user donning head-mounted display 104 and wearable 102. In some examples, display screen 110 of head-mounted display 104 may include and/or represent lenses that facilitate and/or support see-through visibility with superimposed virtual overlays. For example, wearable 102 may transmit precise time-stamped UWB-IR signals to various UWB antennas incorporated into head-mounted display 104. In this example, head-mounted display 104 may be able to determine the angle of arrival for the time-stamped signals. Based on the angle of arrival, head-mounted display 104 may be able to triangulate and/or track the relative location of a hand 902 proximate to wearable 102. Head-mounted display 104 may then display a virtual component 904 that corresponds to the location of hand 902 in the field of view of display screen 110.

In some examples, head-mounted display 104 may superimpose a virtual component 906 over certain real components visible via display screen 110. For example, virtual component 904 may include and/or represent a pointer controlled by movements and/or gestures of wearable 102 and/or hand 902, and virtual component 906 may include and/or represent a message, dialog box, and/or modal window. In one example, the user may perform one or more gestures and/or movements in connection with virtual component 906 to interact with, open, control, modify, and/or otherwise manipulate virtual component 906. In this example, wearable 102 may detect neuromuscular signals indicative of such gestures and/or movements, and head-mounted display 104 may receive data indicative of such gestures and/or movements from wearable 102. Head-mounted display 104 may then determine that the user performed such gestures and/or movements as virtual component 904 overlapped with virtual component 906. As a result, head-mounted display 104 may perform one or more actions (e.g., clicking, rotating, dragging, dropping, zooming, etc.) mapped to such gestures and/or movements in connection with virtual component 906.

Figure 10:
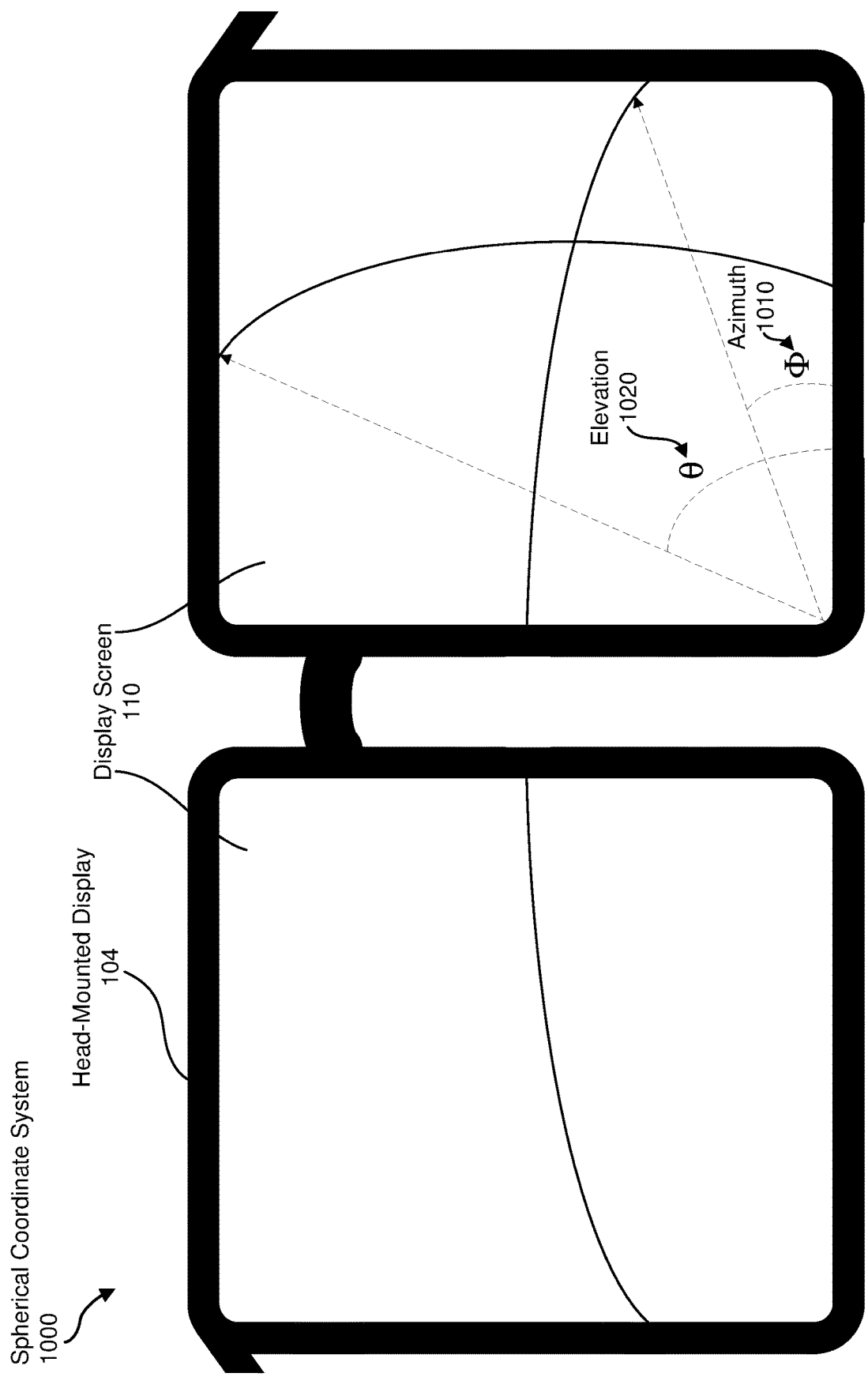
FIG. 10 is an illustration of an exemplary spherical coordinate system for translating user input to a display screen of a head-mounted display according to one or more embodiments of this disclosure.

FIG. 10 illustrates an exemplary spherical coordinate system 1000 for translating user input to display screen 110 of head-mounted display 104. As illustrated in FIG. 10, exemplary spherical coordinate system 1000 may include and/or represent an azimuth 1010 and an elevation 1020. In some examples, head-mounted display 104 may present a virtual component (e.g., a pointer and/or cursor) at a location and/or position defined by azimuth 1010 and elevation 1020 of spherical coordinate system 1000 within the field of view of display screen 110.

Figure 11:
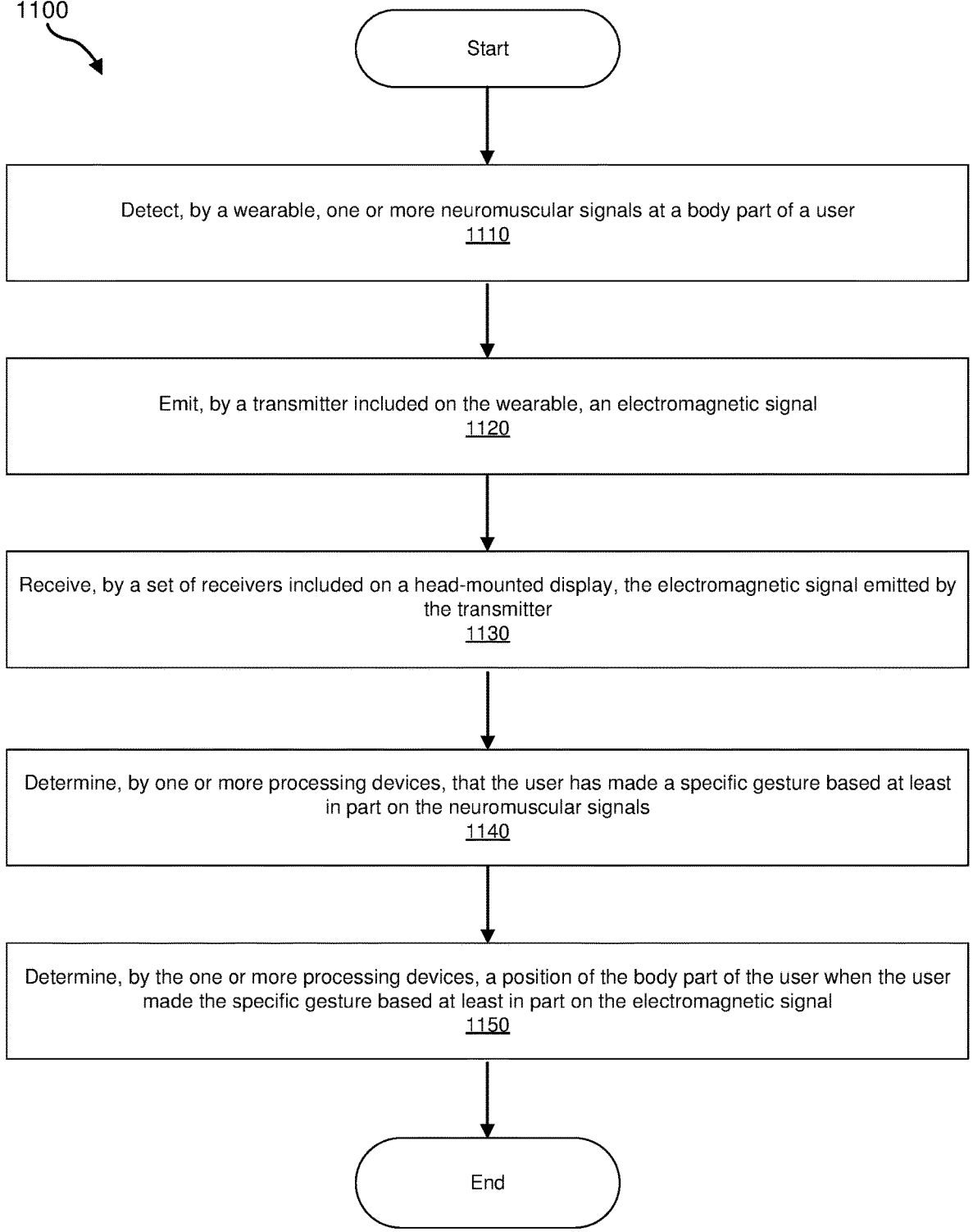
FIG. 11 is a flowchart of an exemplary method for detecting user input via hand gestures and arm movements according to one or more embodiments of this disclosure.

FIG. 11 is a flow diagram of an exemplary method 1100 for detecting user input via hand gestures and arm movements. In one example, the steps shown in FIG. 11 may be performed during operation of an artificial-reality system. Additionally or alternatively, the steps shown in FIG. 11 may also incorporate and/or involve various sub-steps and/or variations consistent with the descriptions provided above in connection with FIGS. 1-10.

As illustrated in FIG. 11, method 1100 may include and/or involve the step of detecting, by a wearable, one or more neuromuscular signals at a body part of a user (1110). Step 1110 may be performed in a variety of ways, including any of those described above in connection with FIGS. 1-10. For example, a wearable donned by a user of an artificial-reality system may detect one or more neuromuscular signals at a body part of a user.

Method 1100 may also include and/or involve the step of emitting an electromagnetic signal by a transmitter included on the wearable (1120). Step 1120 may be performed in a variety of ways, including any of those described above in connection with FIGS. 1-10. For example, the wearable may include a transmitter that emits and/or transmits a UWB-IR signal to an array of UWB antennas arranged on the head-mounted display.

Method 1100 may further include and/or involve the step of receiving the electromagnetic signal emitted by the transmitter at a set of receivers included on the head-mounted display (1130). Step 1130 may be performed in a variety of ways, including any of those described above in connection with FIGS. 1-10. For example, a set of UWB antennas arranged on the head-mounted display may detect and/or receive the UWB-IR signal emitted and/or transmitted by the transmitter included on the wearable.

Method 1100 may additionally include and/or involve the step of determining that the user has made a specific gesture based at least in part on the neuromuscular signals (1140). Step 1140 may be performed in a variety of ways, including any of those described above in connection with FIGS. 1-10. For example, a processing device incorporated in the wearable or the head-mounted display may determine and/or identify a specific gesture and/or movement made by the user based at least in part on the neuromuscular signals.

Method 1100 may also include and/or involve the step of determining a position of the body part of the user when the user made the specific gesture based at least in part on the electromagnetic signal (1150). Step 1150 may be performed in a variety of ways, including any of those described above in connection with FIGS. 1-10. For example, a processing device incorporated in the head-mounted display may determine and/or identify a position of the body part of the user when the user made the specific gesture based at least in part on the electromagnetic signal received from the wearable.

As described above in connection with FIGS. 1-11, AR glasses and/or corresponding systems may facilitate and/or support multidimensional virtual cursor movement and object selection through arm movement and hand gestures. In some examples, AR glasses may incorporate a set of UWB antennas that receive various information and/or data from a wristband worn by a user. In one example, the wristband may include a UWB impulse radio that transmits precise time-stamped signals to the set of UWB antennas incorporated into the AR glasses. In this example, the AR glasses may be able to determine the angle of arrival for the time-stamped signals. Based on the angle of arrival, the AR glasses may be able to triangulate and/or track the relative location of the user's hand proximate to the wristband. The AR glasses may then display a virtual representation of the user's hand and/or a cursor in the user's field of view.

In addition, the wristband may include a set of EMG sensors that measure EMG activity at the user's wrist. In this example, the wristband and/or the AR glasses may be able to decipher certain hand gestures performed by the user while operating the AR glasses based at least in part on the EMG activity measured by the EMG sensors. The wristband and/or the AR glasses may then determine whether any of those hand gestures correspond to certain commands and/or user input to be applied to the user's AR experience. For example, the user may point to real and/or virtual components displayed in the user's AR experience, and the AR glasses may determine which real and/or virtual components the user is pointing to based at least in part on the angle of arrival of the UWB-transmitted signals. The user may then select such components in the AR experience by performing a certain gesture with his or her hands, as detected by EMG activity measured by the EMG sensors.

Example Embodiments

Example 1: An artificial-reality system comprising (1) a wearable dimensioned to be donned on a body part of a user, wherein the wearable comprises (A) a set of electrodes that detect one or more neuromuscular signals via the body part of the user and (B) a transmitter that transmits an electromagnetic signal, (2) a head-mounted display communicatively coupled to the wearable, wherein the head-mounted display comprises a set of receivers that receive the electromagnetic signal transmitted by the transmitter included on the wearable, and (3) one or more processing devices that (1) determine, based at least in part on the neuromuscular signals detected via the body part of the user, that the user has made a specific gesture and (2) determine, based at least in part on the electromagnetic signal received by the set of receivers included on the head-mounted display, a position of the body part of the user when the user made the specific gesture.

Example 2: The artificial-reality system of Example 1, wherein at least one of the processing devices is incorporated in the wearable.

Example 3: The artificial-reality system of Example 1 or 2, wherein at least one of the processing devices is incorporated in the head-mounted display.

Example 4: The artificial-reality system of any of Examples 1-3, wherein (1) the wearable comprises a first Bluetooth radio and (2) the head-mounted display comprises a second Bluetooth radio that is communicatively coupled to the first Bluetooth radio, the first and second Bluetooth radios being configured to exchange configuration data between the wearable and the head-mounted display.

Example 5: The artificial-reality system of any of Examples 1-4, wherein the first and second Bluetooth radios are further configured to exchange data about the neuromuscular signals between the wearable and the head-mounted display.

Example 6: The artificial-reality system of any of Examples 1-5, wherein at least one of the processing devices generates, based at least in part on the data about the neuromuscular signals, an input command that causes the head-mounted display to modify at least one virtual component to account for the specific gesture.

Example 7: The artificial-reality system of any of Examples 1-6, wherein the transmitter incorporates a time stamp into the electromagnetic signal before transmitting the electromagnetic signal to the set of receivers.

Example 8: The artificial-reality system of any of Examples 1-7, wherein at least one of the processing devices (1) determines a first time of arrival for the electromagnetic signal as received by a first receiver included in the set of receivers, (2) determines a second time of arrival for the electromagnetic signal as received by a second receiver included in the set of receivers, and (3) calculates, based at least in part on the first and second times of arrival for the electromagnetic signal and the time stamp, an angle of arrival for the electromagnetic signal relative to the set of receivers.

Example 9: The artificial-reality system of any of Examples 1-8, wherein at least one of the processing devices (1) calculates, based at least in part on the angle of arrival, at least one dimension for a position of a virtual component within a field of view of the head-mounted display and (2) presents the virtual component at the position within the field of view of the head-mounted display based at least in part on the dimension.

Example 10: The artificial-reality system of any of Examples 1-9, wherein the dimension calculated for the position of the virtual component comprises at least one of (1) an azimuth for the virtual component to be presented within the field of view of the head-mounted display, (2) an elevation for the virtual component to be presented within the field of view of the head-mounted display, or (3) a depth for the virtual component to be presented within the field of view of the head-mounted display.

Example 11: The artificial-reality system of any of Examples 1-10, wherein at least one of the processing devices (1) determines a first phase of the electromagnetic signal as received by the first receiver included in the set of receivers, (2) determines a second phase of the electromagnetic signal as received by the second receiver included in the set of receivers, and (3) calculates, based at least in part on a difference between the first and second phases of the electromagnetic signal and the time stamp, an angle of arrival for the electromagnetic signal relative to the set of receivers.

Example 12: The artificial-reality system of any of Examples 1-11, wherein at least one of the processing devices (1) calculates, based at least in part on the angle of arrival, a two-dimensional position for the virtual component within the field of view of the head-mounted display and (2) presents the virtual component at the two-dimensional position within the field of view of the head-mounted display.

Example 13: The artificial-reality system of any of Examples 1-12, wherein at least one of the processing devices (1) calculates, based at least in part on the angle of arrival, a three-dimensional position for the virtual component within the field of view of the head-mounted display and (2) presents the virtual component at the three-dimensional position within the field of view of the head-mounted display.

Example 14: The artificial-reality system of any of Examples 1-13, wherein (1) the virtual component presented at the position comprises a pointer presented at the position and (2) at least one of the processing devices superimposes the pointer over a screen of the head-mounted display.

Example 15: The artificial-reality system of any of Examples 1-14, wherein at least one of the processing devices generates, based at least in part on data about the neuromuscular signals, an input command that causes the head-mounted display to modify at least one additional virtual component presented proximate to the pointer within a field of view of the head-mounted display to account for the specific gesture.

Example 16: The artificial-reality system of any of Examples 1-15, wherein at least one of the processing devices (1) determines, based at least in part on the angle of arrival, that the wearable is no longer visible within the field of view of the head-mounted display and, in response to determining that the wearable is no longer visible within the field of view of the head-mounted display, (2) removing the virtual component from the field of view of the head-mounted display.

Example 17: The artificial-reality system of any of Examples 1-16, further comprising an additional wearable dimensioned to be donned on an additional body part of the user, wherein the wearable comprises (1) an additional set of electrodes that detect one or more additional neuromuscular signals via the additional body part of the user and (2) at least one additional transmitter that transmits an additional electromagnetic signal, wherein the head-mounted display is also communicatively coupled to the additional wearable, the set of receivers receiving the additional electromagnetic signal transmitted by the additional transmitter included on the additional wearable and at least one of the processing devices (1) determines, based at least in part on the additional neuromuscular signals detected via the body part of the user, that the user has made an additional gesture and (2) determines, based at least in part on the additional electromagnetic signal received by the set of receivers included on the head-mounted display, a position of the body part of the user when the user made the additional gesture.

Example 18: The artificial-reality system of any of Examples 1-17, wherein at least one of the processing devices (1) calculates, based at least in part on the electromagnetic signal, at least one dimension for a position of a virtual component within a field of view of the head-mounted display, (2) calculates, based at least in part on the additional electromagnetic signal, at least one additional dimension for an additional position of an additional virtual component within the field of view of the head-mounted display, and (3) simultaneously presents, within the field of view of the head-mounted display, the virtual component at the position and the additional virtual component at the additional position based at least in part on the dimension and the additional dimension.

Example 19: A head-mounted display comprising (1) a set of receivers configured to receive an electromagnetic signal transmitted by a transmitter included on a wearable dimensioned to be donned on a body part of a user, (2) a radio configured to receive data about one or more neuromuscular signals detected by the wearable via the body part of the user, and (3) at least one processing device communicatively coupled to the set of receivers and the radio, wherein the processing device (A) determines, based at least in part on the data about the neuromuscular signals detected via the body part of the user, that the user has made a specific gesture and (B) determines, based at least in part on the electromagnetic signal received by the set of receivers included on the head-mounted display, a position of the body part of the user when the user made the specific gesture.

Example 20: A method comprising (1) detecting, by a wearable donned on a body part of a user, one or more neuromuscular signals at the body part of the user, (2) emitting, by a transmitter included on the wearable, an electromagnetic signal, (3) receiving, by a set of receivers included on a head-mounted display donned by the user, the electromagnetic signal emitted by the transmitter included on the wearable, (4) determining, by one or more processing devices, that the user has made a specific gesture based at least in part on the neuromuscular signals, and (5) determining, by the one or more processing devices, a position of the body part of the user when the user made the specific gesture based at least in part on the electromagnetic signal.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a 3D effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1200 in FIG. 12) or that visually immerses a user in an artificial reality (such as, e.g., virtual-reality system 1300 in FIG. 13). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 12:
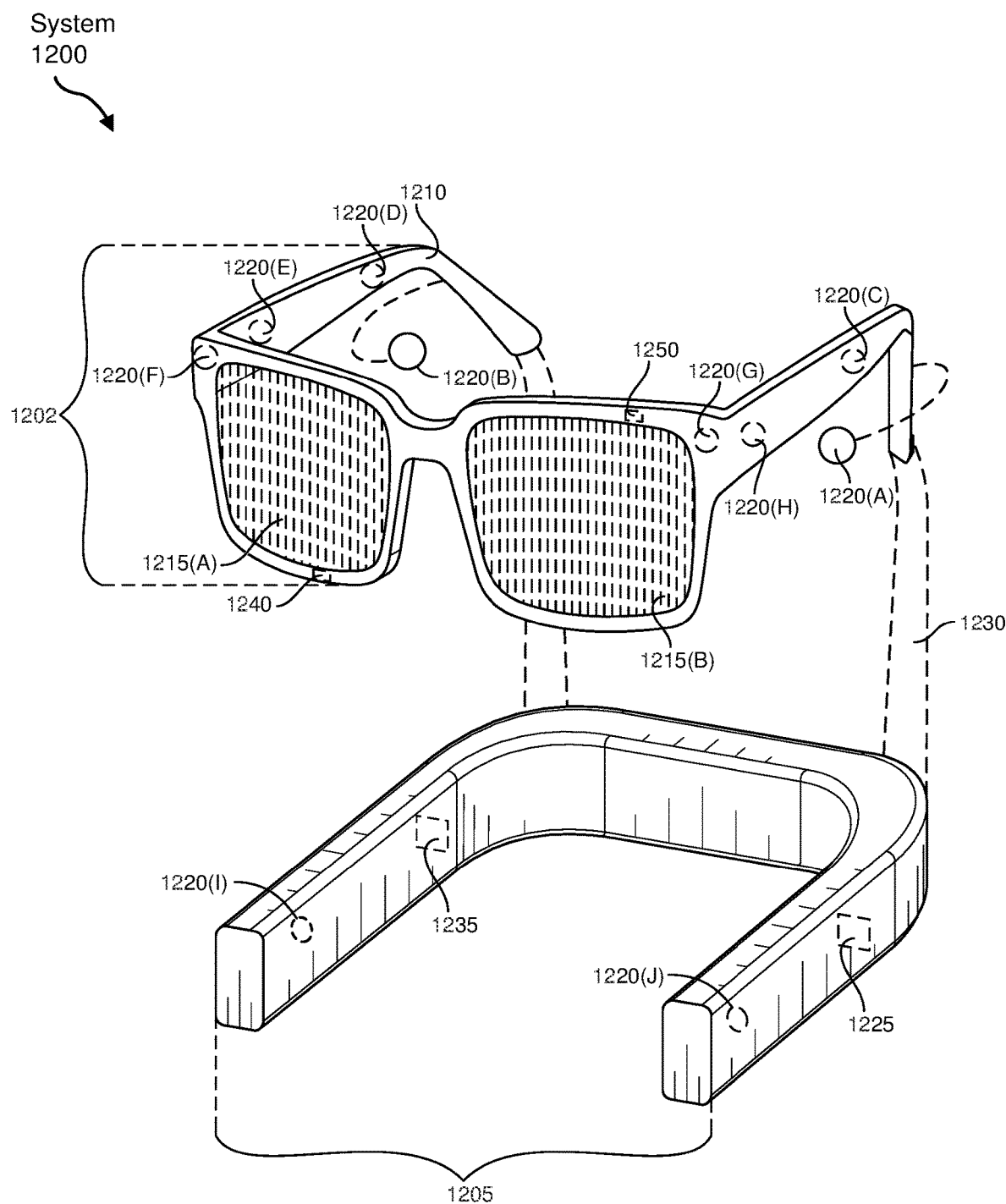
FIG. 12 is an illustration of exemplary augmented-reality glasses that may be used in connection with embodiments of this disclosure.

Turning to FIG. 12, augmented-reality system 1200 may include an eyewear device 1202 with a frame 1210 configured to hold a left display device 1215(A) and a right display device 1215(B) in front of a user's eyes. Display devices 1215(A) and 1215(B) may act together or independently to present an image or series of images to a user. While augmented-reality system 1200 includes two displays, embodiments of this disclosure may be implemented in augmented-reality systems with a single NED or more than two NEDs.

In some embodiments, augmented-reality system 1200 may include one or more sensors, such as sensor 1240. Sensor 1240 may generate measurement signals in response to motion of augmented-reality system 1200 and may be located on substantially any portion of frame 1210. Sensor 1240 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1200 may or may not include sensor 1240 or may include more than one sensor. In embodiments in which sensor 1240 includes an IMU, the IMU may generate calibration data based on measurement signals from sensor 1240. Examples of sensor 1240 may include, without limitation, accelerometers, gyroscopes, magnetometers, other suitable types of sensors that detect motion, sensors used for error correction of the IMU, or some combination thereof.

In some examples, augmented-reality system 1200 may also include a microphone array with a plurality of acoustic transducers 1220(A)-1220(J), referred to collectively as acoustic transducers 1220. Acoustic transducers 1220 may represent transducers that detect air pressure variations induced by sound waves. Each acoustic transducer 1220 may be configured to detect sound and convert the detected sound into an electronic format (e.g., an analog or digital format). The microphone array in FIG. 12 may include, for example, ten acoustic transducers: 1220(A) and 1220(B), which may be designed to be placed inside a corresponding ear of the user, acoustic transducers 1220(C), 1220(D), 1220(E), 1220(F), 1220(G), and 1220(H), which may be positioned at various locations on frame 1210, and/or acoustic transducers 1220(I) and 1220(J), which may be positioned on a corresponding neckband 1205.

In some embodiments, one or more of acoustic transducers 1220(A)-(J) may be used as output transducers (e.g., speakers). For example, acoustic transducers 1220(A) and/or 1220(B) may be earbuds or any other suitable type of headphone or speaker.

The configuration of acoustic transducers 1220 of the microphone array may vary. While augmented-reality system 1200 is shown in FIG. 12 as having ten acoustic transducers 1220, the number of acoustic transducers 1220 may be greater or less than ten. In some embodiments, using higher numbers of acoustic transducers 1220 may increase the amount of audio information collected and/or the sensitivity and accuracy of the audio information. In contrast, using a lower number of acoustic transducers 1220 may decrease the computing power required by an associated controller 1250 to process the collected audio information. In addition, the position of each acoustic transducer 1220 of the microphone array may vary. For example, the position of an acoustic transducer 1220 may include a defined position on the user, a defined coordinate on frame 1210, an orientation associated with each acoustic transducer 1220, or some combination thereof.

Acoustic transducers 1220(A) and 1220(B) may be positioned on different parts of the user's ear, such as behind the pinna, behind the tragus, and/or within the auricle or fossa. Or, there may be additional acoustic transducers 1220 on or surrounding the ear in addition to acoustic transducers 1220 inside the ear canal. Having an acoustic transducer 1220 positioned next to an ear canal of a user may enable the microphone array to collect information on how sounds arrive at the ear canal. By positioning at least two of acoustic transducers 1220 on either side of a user's head (e.g., as binaural microphones), augmented-reality system 1200 may simulate binaural hearing and capture a 3D stereo sound field around a user's head. In some embodiments, acoustic transducers 1220(A) and 1220(B) may be connected to augmented-reality system 1200 via a wired connection 1230, and in other embodiments acoustic transducers 1220(A) and 1220(B) may be connected to augmented-reality system 1200 via a wireless connection (e.g., a BLUETOOTH connection). In still other embodiments, acoustic transducers 1220(A) and 1220(B) may not be used at all in conjunction with augmented-reality system 1200.

Acoustic transducers 1220 on frame 1210 may be positioned in a variety of different ways, including along the length of the temples, across the bridge, above or below display devices 1215(A) and 1215(B), or some combination thereof. Acoustic transducers 1220 may also be oriented such that the microphone array is able to detect sounds in a wide range of directions surrounding the user wearing the augmented-reality system 1200. In some embodiments, an optimization process may be performed during manufacturing of augmented-reality system 1200 to determine relative positioning of each acoustic transducer 1220 in the microphone array.

In some examples, augmented-reality system 1200 may include or be connected to an external device (e.g., a paired device), such as neckband 1205. Neckband 1205 generally represents any type or form of paired device. Thus, the following discussion of neckband 1205 may also apply to various other paired devices, such as charging cases, smart watches, smart phones, wrist bands, other wearable devices, hand-held controllers, tablet computers, laptop computers, other external compute devices, etc.

As shown, neckband 1205 may be coupled to eyewear device 1202 via one or more connectors. The connectors may be wired or wireless and may include electrical and/or non-electrical (e.g., structural) components. In some cases, eyewear device 1202 and neckband 1205 may operate independently without any wired or wireless connection between them. While FIG. 12 illustrates the components of eyewear device 1202 and neckband 1205 in example locations on eyewear device 1202 and neckband 1205, the components may be located elsewhere and/or distributed differently on eyewear device 1202 and/or neckband 1205. In some embodiments, the components of eyewear device 1202 and neckband 1205 may be located on one or more additional peripheral devices paired with eyewear device 1202, neckband 1205, or some combination thereof.

Pairing external devices, such as neckband 1205, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1200 may be provided by a paired device or shared between a paired device and an eyewear device, thus reducing the weight, heat profile, and form factor of the eyewear device overall while still retaining desired functionality. For example, neckband 1205 may allow components that would otherwise be included on an eyewear device to be included in neckband 1205 since users may tolerate a heavier weight load on their shoulders than they would tolerate on their heads. Neckband 1205 may also have a larger surface area over which to diffuse and disperse heat to the ambient environment. Thus, neckband 1205 may allow for greater battery and computation capacity than might otherwise have been possible on a stand-alone eyewear device. Since weight carried in neckband 1205 may be less invasive to a user than weight carried in eyewear device 1202, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 1205 may be communicatively coupled with eyewear device 1202 and/or to other devices. These other devices may provide certain functions (e.g., tracking, localizing, depth mapping, processing, storage, etc.) to augmented-reality system 1200. In the embodiment of FIG. 12, neckband 1205 may include two acoustic transducers (e.g., 1220(1) and 1220(J)) that are part of the microphone array (or potentially form their own microphone subarray). Neckband 1205 may also include a controller 1225 and a power source 1235.

Acoustic transducers 1220(1) and 1220(J) of neckband 1205 may be configured to detect sound and convert the detected sound into an electronic format (analog or digital). In the embodiment of FIG. 12, acoustic transducers 1220(1) and 1220(J) may be positioned on neckband 1205, thereby increasing the distance between the neckband acoustic transducers 1220(1) and 1220(J) and other acoustic transducers 1220 positioned on eyewear device 1202. In some cases, increasing the distance between acoustic transducers 1220 of the microphone array may improve the accuracy of beamforming performed via the microphone array. For example, if a sound is detected by acoustic transducers 1220(C) and 1220(D) and the distance between acoustic transducers 1220(C) and 1220(D) is greater than, e.g., the distance between acoustic transducers 1220(D) and 1220(E), the determined source location of the detected sound may be more accurate than if the sound had been detected by acoustic transducers 1220(D) and 1220(E).

Controller 1225 of neckband 1205 may process information generated by the sensors on neckband 1205 and/or augmented-reality system 1200. For example, controller 1225 may process information from the microphone array that describes sounds detected by the microphone array. For each detected sound, controller 1225 may perform a direction-of-arrival (DOA) estimation to estimate a direction from which the detected sound arrived at the microphone array. As the microphone array detects sounds, controller 1225 may populate an audio data set with the information. In embodiments in which augmented-reality system 1200 includes an inertial measurement unit, controller 1225 may compute all inertial and spatial calculations from the IMU located on eyewear device 1202. A connector may convey information between augmented-reality system 1200 and neckband 1205 and between augmented-reality system 1200 and controller 1225. The information may be in the form of optical data, electrical data, wireless data, or any other transmittable data form. Moving the processing of information generated by augmented-reality system 1200 to neckband 1205 may reduce weight and heat in eyewear device 1202, making it more comfortable to the user.

Power source 1235 in neckband 1205 may provide power to eyewear device 1202 and/or to neckband 1205. Power source 1235 may include, without limitation, lithium-ion batteries, lithium-polymer batteries, primary lithium batteries, alkaline batteries, or any other form of power storage. In some cases, power source 1235 may be a wired power source. Including power source 1235 on neckband 1205 instead of on eyewear device 1202 may help better distribute the weight and heat generated by power source 1235.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1300 in FIG. 13, that mostly or completely covers a user's field of view. Virtual-reality system 1300 may include a front rigid body 1302 and a band 1304 shaped to fit around a user's head. Virtual-reality system 1300 may also include output audio transducers 1306(A) and 1306(B). Furthermore, while not shown in FIG. 13, front rigid body 1302 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 1200 and/or virtual-reality system 1300 may include one or more liquid crystal displays (LCDs), light-emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1200 and/or virtual-reality system 1300 may include microLED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1200 and/or virtual-reality system 1300 may include one or more optical sensors, such as 2D or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, bodysuits, handheld controllers, environmental devices (e.g., chairs, floor mats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

Some augmented-reality systems may map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, BLUETOOTH, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. Augmented-reality and virtual-reality devices (such as systems 1200 and 1300 of FIGS. 12 and 13, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

As noted, artificial-reality systems 1200 and 1300 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 14:
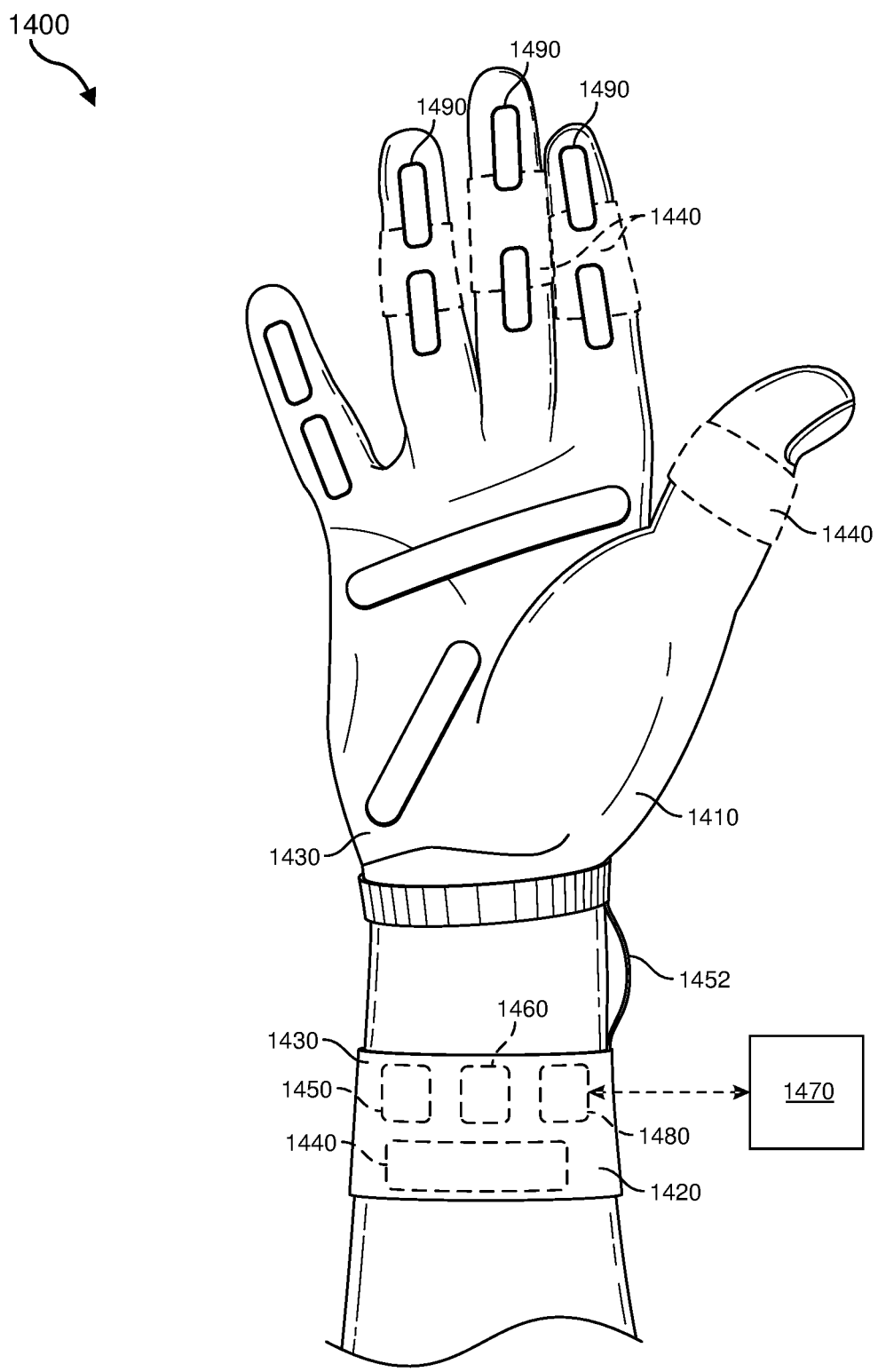
FIG. 14 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 14 illustrates a vibrotactile system 1400 in the form of a wearable glove (haptic device 1410) and wristband (haptic device 1420). Haptic device 1410 and haptic device 1420 are shown as examples of wearable devices that include a flexible, wearable textile material 1430 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1440 may be positioned at least partially within one or more corresponding pockets formed in textile material 1430 of vibrotactile system 1400. Vibrotactile devices 1440 may be positioned in locations to provide a vibrating sensation (e.g., haptic feedback) to a user of vibrotactile system 1400. For example, vibrotactile devices 1440 may be positioned against the user's finger(s), thumb, or wrist, as shown in FIG. 14. Vibrotactile devices 1440 may, in some examples, be sufficiently flexible to conform to or bend with the user's corresponding body part(s).

A power source 1450 (e.g., a battery) for applying a voltage to the vibrotactile devices 1440 for activation thereof may be electrically coupled to vibrotactile devices 1440, such as via conductive wiring 1452. In some examples, each of vibrotactile devices 1440 may be independently electrically coupled to power source 1450 for individual activation. In some embodiments, a processor 1460 may be operatively coupled to power source 1450 and configured (e.g., programmed) to control activation of vibrotactile devices 1440.

Vibrotactile system 1400 may be implemented in a variety of ways. In some examples, vibrotactile system 1400 may be a standalone system with integral subsystems and components for operation independent of other devices and systems. As another example, vibrotactile system 1400 may be configured for interaction with another device or system 1470. For example, vibrotactile system 1400 may, in some examples, include a communications interface 1480 for receiving and/or sending signals to the other device or system 1470. The other device or system 1470 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1480 may enable communications between vibrotactile system 1400 and the other device or system 1470 via a wireless (e.g., Wi-Fi, BLUETOOTH, cellular, radio, etc.) link or a wired link. If present, communications interface 1480 may be in communication with processor 1460, such as to provide a signal to processor 1460 to activate or deactivate one or more of the vibrotactile devices 1440.

Vibrotactile system 1400 may optionally include other subsystems and components, such as touch-sensitive pads 1490, pressure sensors, motion sensors, position sensors, lighting elements, and/or user interface elements (e.g., an on/off button, a vibration control element, etc.). During use, vibrotactile devices 1440 may be configured to be activated for a variety of different reasons, such as in response to the user's interaction with user interface elements, a signal from the motion or position sensors, a signal from the touch-sensitive pads 1490, a signal from the pressure sensors, a signal from the other device or system 1470, etc.

Although power source 1450, processor 1460, and communications interface 1480 are illustrated in FIG. 14 as being positioned in haptic device 1420, the present disclosure is not so limited. For example, one or more of power source 1450, processor 1460, or communications interface 1480 may be positioned within haptic device 1410 or within another wearable textile.

Figure 15:
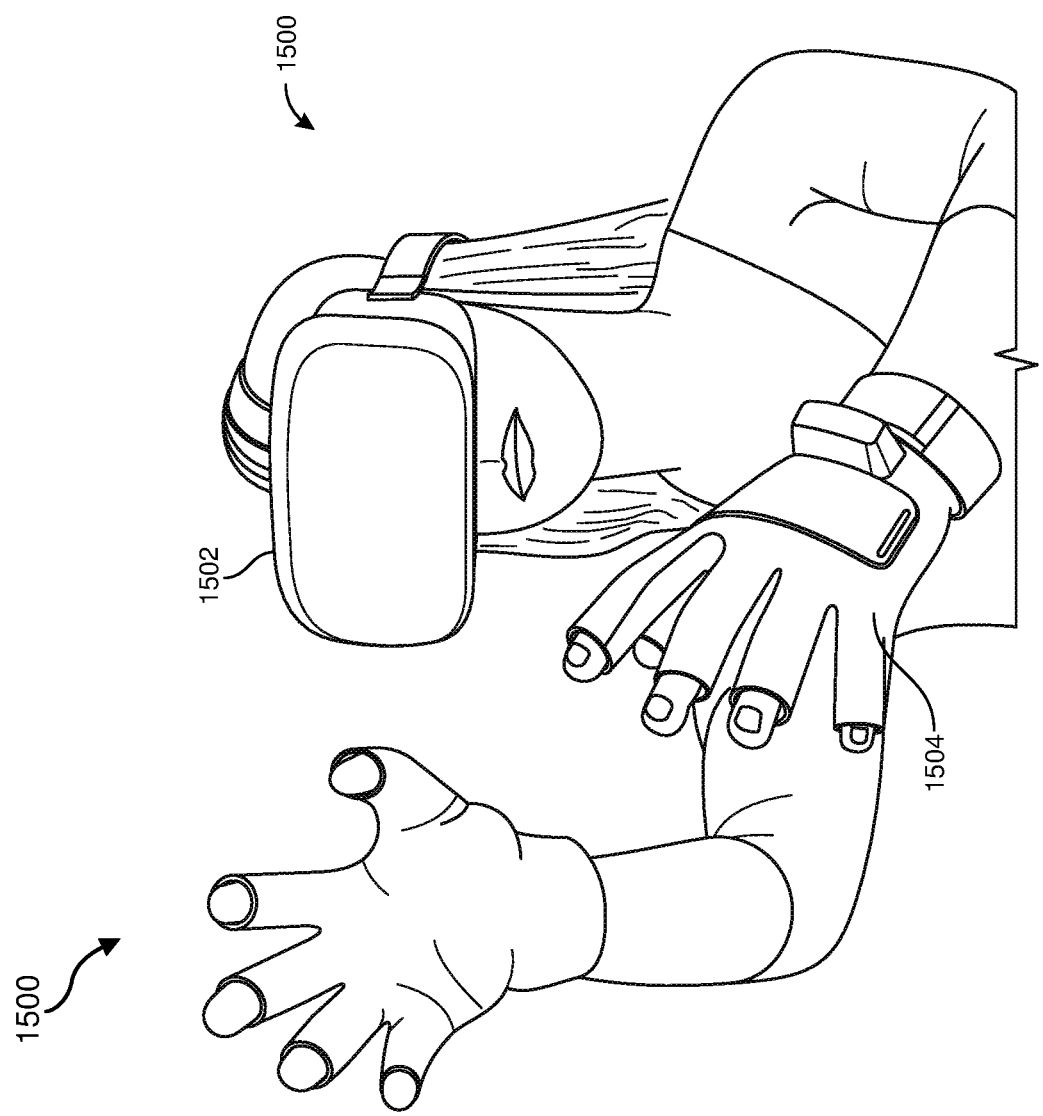
FIG. 15 is an illustration of an exemplary virtual-reality environment according to embodiments of this disclosure.

Haptic wearables, such as those shown in and described in connection with FIG. 14, may be implemented in a variety of types of artificial-reality systems and environments. FIG. 15 shows an example artificial-reality environment 1500 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 13:
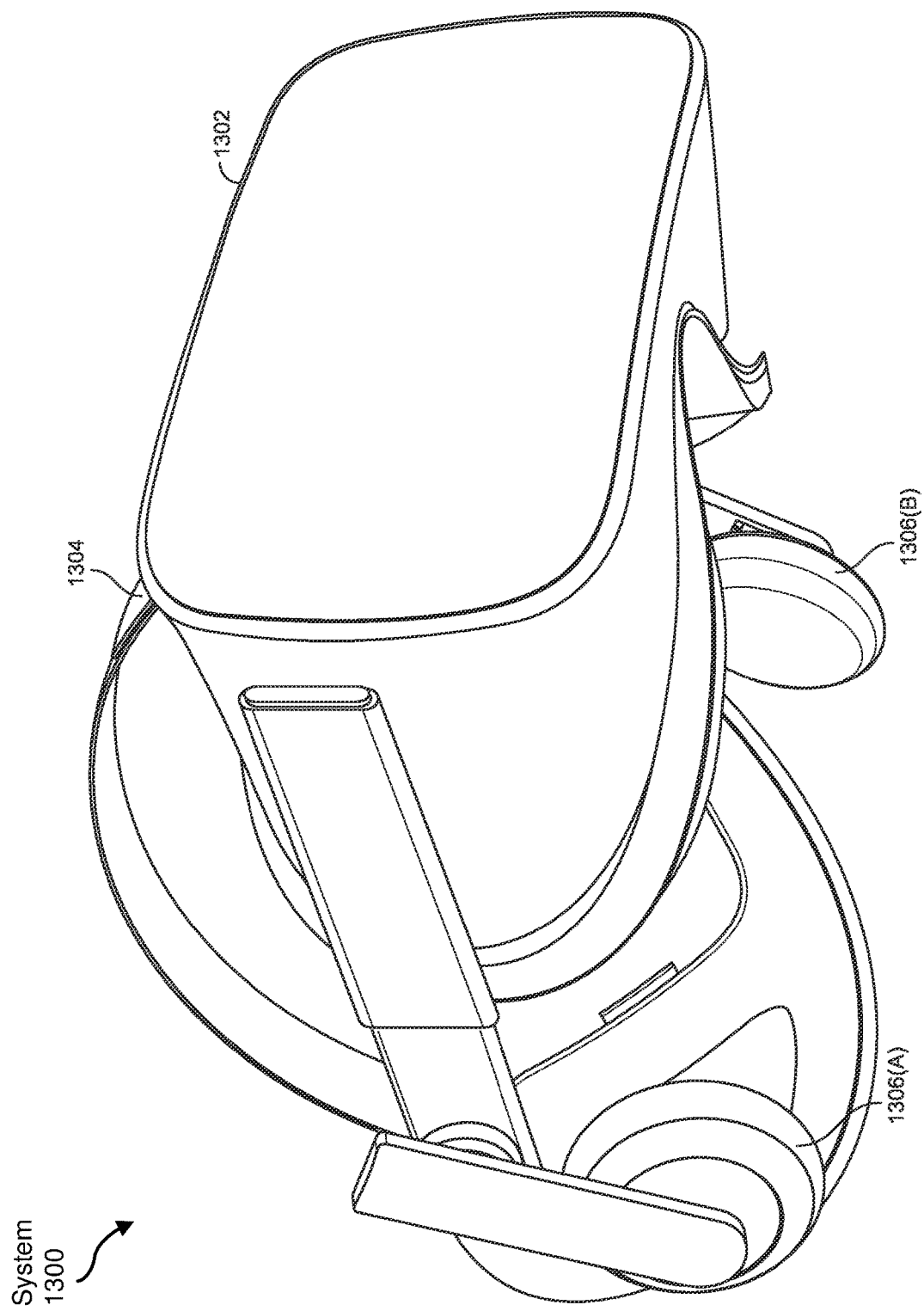
FIG. 13 is an illustration of an exemplary virtual-reality headset that may be used in connection with embodiments of this disclosure.

Head-mounted display 1502 generally represents any type or form of virtual-reality system, such as virtual-reality system 1300 in FIG. 13. Haptic device 1504 generally represents any type or form of wearable device, worn by a user of an artificial-reality system, that provides haptic feedback to the user to give the user the perception that he or she is physically engaging with a virtual object. In some embodiments, haptic device 1504 may provide haptic feedback by applying vibration, motion, and/or force to the user. For example, haptic device 1504 may limit or augment a user's movement. To give a specific example, haptic device 1504 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1504 to send action requests to a console. Examples of action requests include, without limitation, requests to start an application and/or end the application and/or requests to perform a particular action within the application.

Figure 16:
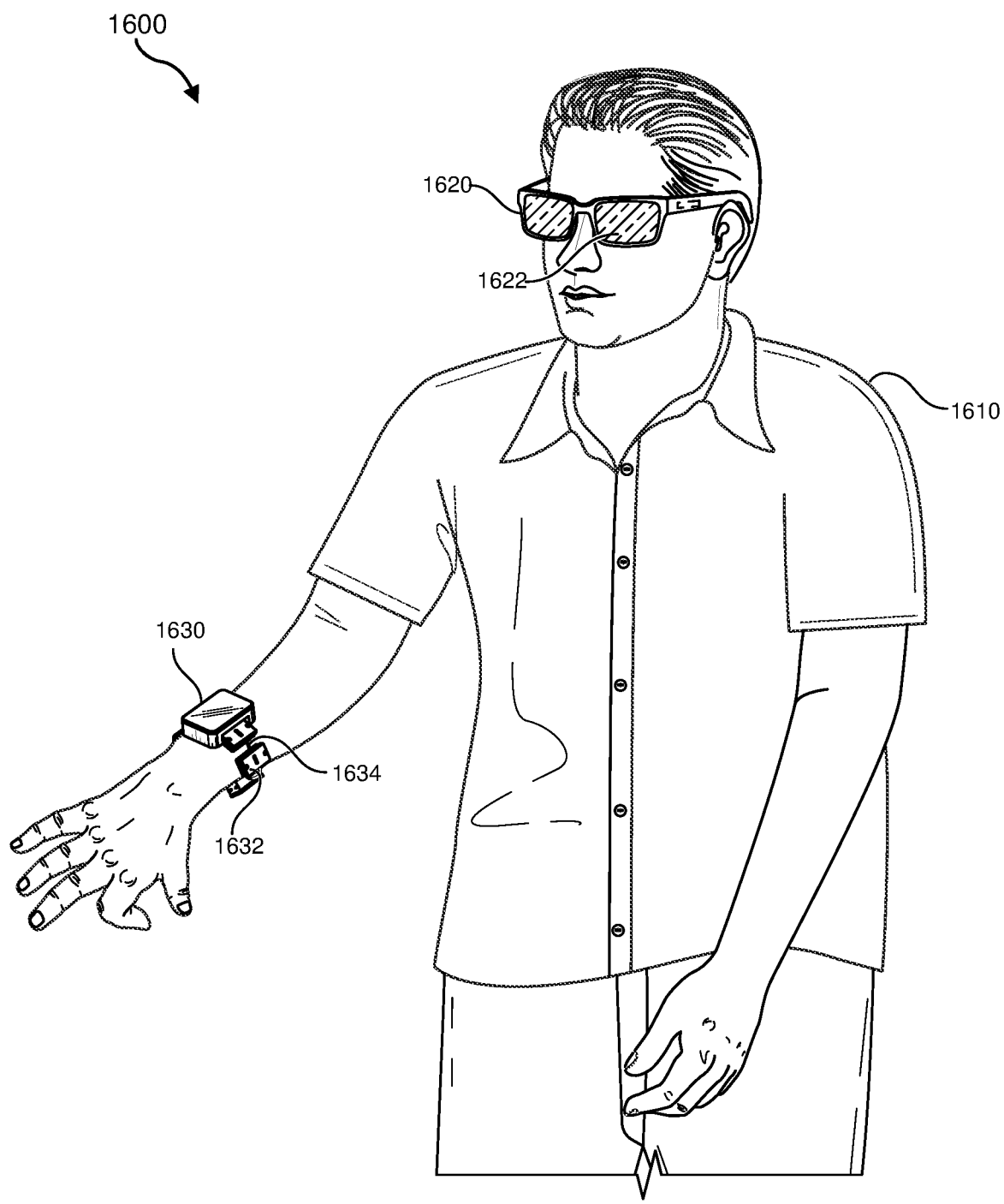
FIG. 16 is an illustration of an exemplary augmented-reality environment according to embodiments of this disclosure.

While haptic interfaces may be used with virtual-reality systems, as shown in FIG. 15, haptic interfaces may also be used with augmented-reality systems, as shown in FIG. 16. FIG. 16 is a perspective view of a user 1610 interacting with an augmented-reality system 1600. In this example, user 1610 may wear a pair of augmented-reality glasses 1620 that may have one or more displays 1622 and that are paired with a haptic device 1630. In this example, haptic device 1630 may be a wristband that includes a plurality of band elements 1632 and a tensioning mechanism 1634 that connects band elements 1632 to one another.

One or more of band elements 1632 may include any type or form of actuator suitable for providing haptic feedback. For example, one or more of band elements 1632 may be configured to provide one or more of various types of cutaneous feedback, including vibration, force, traction, texture, and/or temperature. To provide such feedback, band elements 1632 may include one or more of various types of actuators. In one example, each of band elements 1632 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1410, 1420, 1504, and 1630 may include any suitable number and/or type of haptic transducer, sensor, and/or feedback mechanism. For example, haptic devices 1410, 1420, 1504, and 1630 may include one or more mechanical transducers, piezoelectric transducers, and/or fluidic transducers. Haptic devices 1410, 1420, 1504, and 1630 may also include various combinations of different types and forms of transducers that work together or independently to enhance a user's artificial-reality experience. In one example, each of band elements 1632 of haptic device 1630 may include a vibrotactor (e.g., a vibrotactile actuator) configured to vibrate in unison or independently to provide one or more of various types of haptic sensations to a user.

Figure 17A:
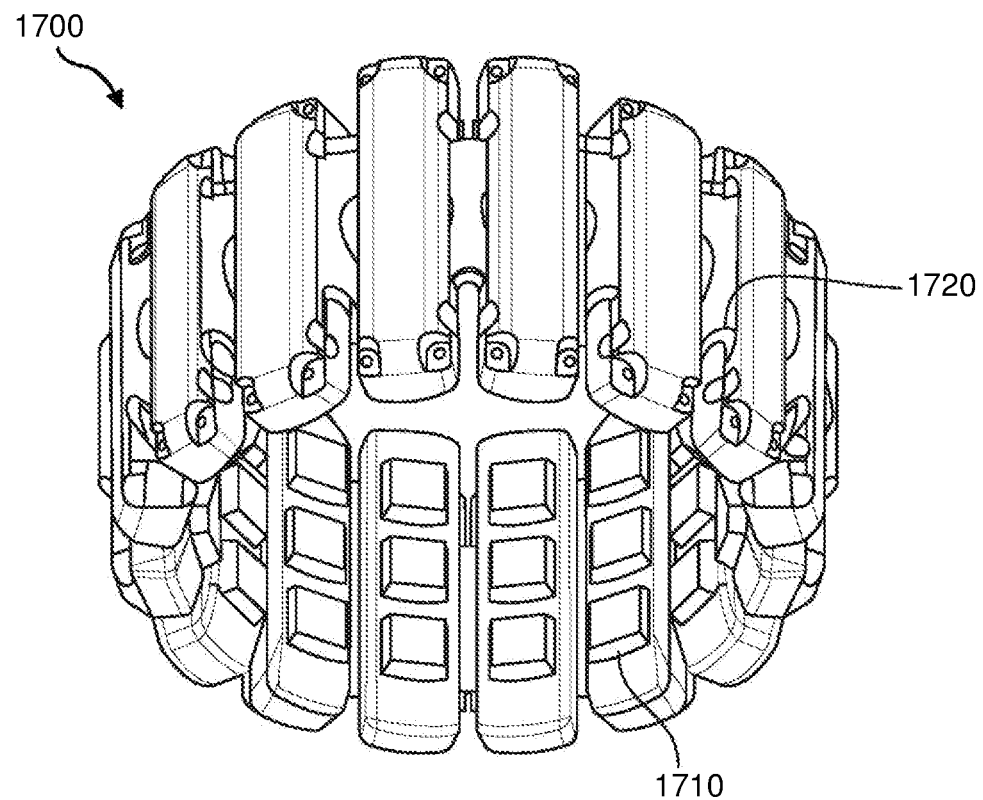
FIGS. 17A and 17B are illustrations of an exemplary human-machine interface configured to be worn around a user's lower arm or wrist.
Figure 17B:
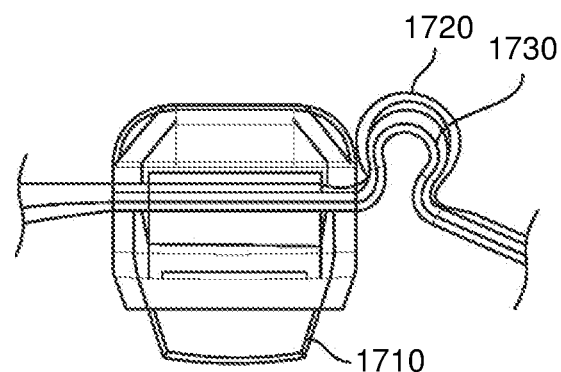

FIG. 17A illustrates an exemplary human-machine interface (also referred to herein as an EMG control interface) configured to be worn around a user's lower arm or wrist as a wearable system 1700. In this example, wearable system 1700 may include sixteen neuromuscular sensors 1710 (e.g., EMG sensors) arranged circumferentially around an elastic band 1720 with an interior surface 1730 configured to contact a user's skin. However, any suitable number of neuromuscular sensors may be used. The number and arrangement of neuromuscular sensors may depend on the particular application for which the wearable device is used. For example, a wearable armband or wristband can be used to generate control information for controlling an augmented reality system, a robot, controlling a vehicle, scrolling through text, controlling a virtual avatar, or any other suitable control task. As shown, the sensors may be coupled together using flexible electronics incorporated into the wireless device. FIG. 17B illustrates a cross-sectional view through one of the sensors of the wearable device shown in FIG. 17A. In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 1710 is discussed in more detail below with reference to FIGS. 18A and 18B.

Figure 18A:
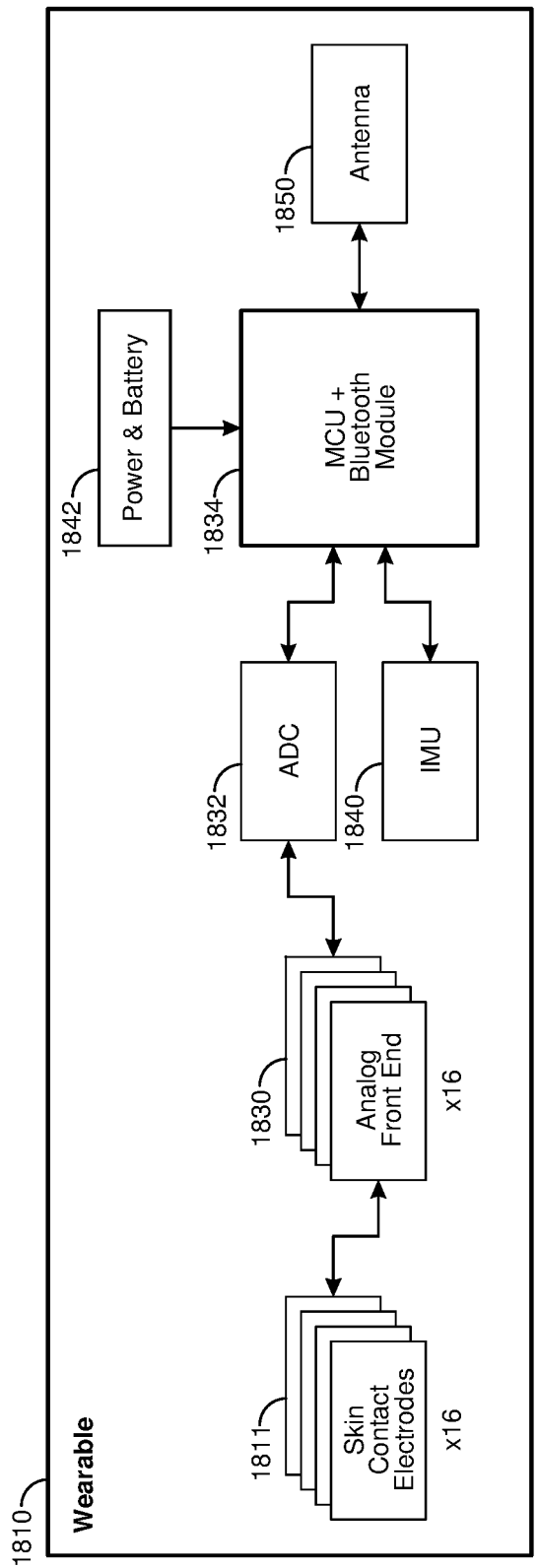
FIGS. 18A and 18B are illustrations of an exemplary schematic diagram with internal components of a wearable system.
Figure 18B:
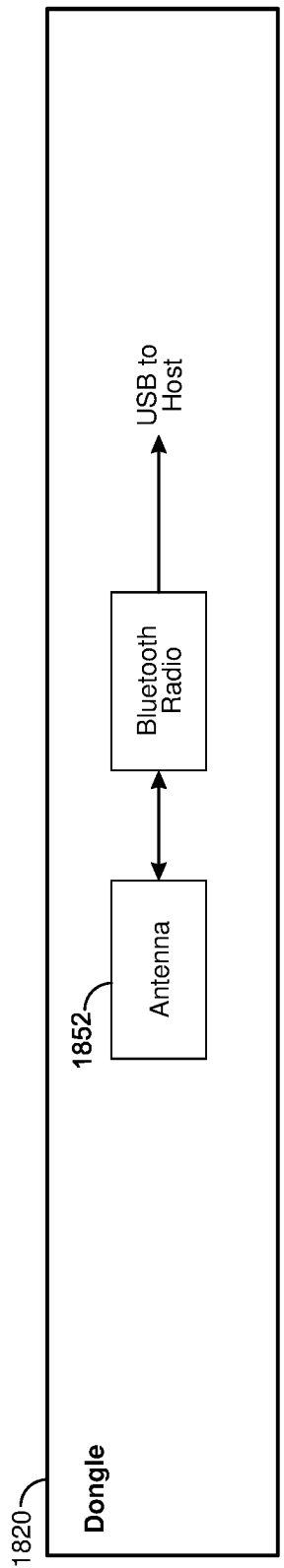

FIGS. 18A and 18B illustrate an exemplary schematic diagram with internal components of a wearable system with EMG sensors. As shown, the wearable system may include a wearable portion 1810 (FIG. 18A) and a dongle portion 1820 (FIG. 18B) in communication with the wearable portion 1810 (e.g., via BLUETOOTH or another suitable wireless communication technology). As shown in FIG. 18A, the wearable portion 1810 may include skin contact electrodes 1811, examples of which are described in connection with FIGS. 17A and 17B. The output of the skin contact electrodes 1811 may be provided to analog front end 1830, which may be configured to perform analog processing (e.g., amplification, noise reduction, filtering, etc.) on the recorded signals. The processed analog signals may then be provided to analog-to-digital converter 1832, which may convert the analog signals to digital signals that can be processed by one or more computer processors. An example of a computer processor that may be used in accordance with some embodiments is microcontroller (MCU) 1834, illustrated in FIG. 18A. As shown, MCU 1834 may also include inputs from other sensors (e.g., IMU sensor 1840), and power and battery module 1842. The output of the processing performed by MCU 1834 may be provided to antenna 1850 for transmission to dongle portion 1820 shown in FIG. 18B.

Dongle portion 1820 may include antenna 1852, which may be configured to communicate with antenna 1850 included as part of wearable portion 1810. Communication between antennas 1850 and 1852 may occur using any suitable wireless technology and protocol, non-limiting examples of which include radiofrequency signaling and BLUETOOTH. As shown, the signals received by antenna 1852 of dongle portion 1820 may be provided to a host computer for further processing, display, and/or for effecting control of a particular physical or virtual object or objects.

Although the examples provided with reference to FIGS. 17A-17B and FIGS. 18A-18B are discussed in the context of interfaces with EMG sensors, the techniques described herein for reducing electromagnetic interference can also be implemented in wearable interfaces with other types of sensors including, but not limited to, mechanomyography (MMG) sensors, sonomyography (SMG) sensors, and electrical impedance tomography (EIT) sensors. The techniques described herein for reducing electromagnetic interference can also be implemented in wearable interfaces that communicate with computer hosts through wires and cables (e.g., USB cables, optical fiber cables, etc.).

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. An artificial-reality system comprising:
    a wearable dimensioned to be donned on a body part of a user, wherein the wearable comprises:
        a set of electrodes that detect one or more neuromuscular signals via the body part of the user; and
        a transmitter that transmits an electromagnetic signal tagged with a time stamp;
    a head-mounted display communicatively coupled to the wearable, wherein the head-mounted display comprises a set of receivers that receive the electromagnetic signal; and
    one or more processing devices that:
        determine, based at least in part on the neuromuscular signals, that the user has made a specific gesture; and
        determine, based at least in part on the electromagnetic signal and the time stamp, a position of the body part of the user relative to the set of receivers when the user made the specific gesture.

2. The artificial-reality system of claim 1, wherein at least one of the processing devices is incorporated in the wearable.

3. The artificial-reality system of claim 1, wherein at least one of the processing devices is incorporated in the head-mounted display.

4. The artificial-reality system of claim 1, wherein:
    the wearable comprises a first short-range radio; and
    the head-mounted display comprises a second short-range radio that is communicatively coupled to the first short-range radio, the first and second short-range radios being configured to exchange configuration data between the wearable and the head-mounted display.

5. The artificial-reality system of claim 4, wherein the first and second short-range radios are further configured to exchange data about the neuromuscular signals between the wearable and the head-mounted display.

6. The artificial-reality system of claim 5, wherein at least one of the processing devices generates, based at least in part on the data about the neuromuscular signals, an input command that causes the head-mounted display to modify at least one virtual component to account for the specific gesture.

7. The artificial-reality system of claim 1, wherein the transmitter tags the electromagnetic signal with the time stamp before transmitting the electromagnetic signal to the set of receivers.

8. The artificial-reality system of claim 7, wherein at least one of the processing devices:
    determines a first time of arrival for the electromagnetic signal as received by a first receiver included in the set of receivers;
    determines a second time of arrival for the electromagnetic signal as received by a second receiver included in the set of receivers; and
    calculates, based at least in part on the first and second times of arrival for the electromagnetic signal and the time stamp, an angle of arrival for the electromagnetic signal relative to the set of receivers.

9. The artificial-reality system of claim 8, wherein at least one of the processing devices:
    calculates, based at least in part on the angle of arrival, at least one dimension for a position of a virtual component within a field of view of the head-mounted display; and
    presents the virtual component at the position within the field of view of the head-mounted display based at least in part on the dimension.

10. The artificial-reality system of claim 9, wherein the dimension calculated for the position of the virtual component comprises at least one of:
    an azimuth for the virtual component to be presented within the field of view of the head-mounted display;
    an elevation for the virtual component to be presented within the field of view of the head-mounted display; or
    a depth for the virtual component to be presented within the field of view of the head-mounted display.

11. The artificial-reality system of claim 9, wherein at least one of the processing devices:
    determines a first phase of the electromagnetic signal as received by the first receiver included in the set of receivers;
    determines a second phase of the electromagnetic signal as received by the second receiver included in the set of receivers; and
    calculates, based at least in part on a difference between the first and second phases of the electromagnetic signal and the time stamp, the angle of arrival for the electromagnetic signal relative to the set of receivers.

12. The artificial-reality system of claim 9, wherein at least one of the processing devices:
    calculates, based at least in part on the angle of arrival, a two-dimensional position for the virtual component within the field of view of the head-mounted display; and
    presents the virtual component at the two-dimensional position within the field of view of the head-mounted display.

13. The artificial-reality system of claim 9, wherein at least one of the processing devices:
    calculates, based at least in part on the angle of arrival, a three-dimensional position for the virtual component within the field of view of the head-mounted display; and
    presents the virtual component at the three-dimensional position within the field of view of the head-mounted display.

14. The artificial-reality system of claim 9, wherein:
    the virtual component presented at the position comprises a pointer presented at the position; and
    at least one of the processing devices superimposes the pointer over a screen of the head-mounted display.

15. The artificial-reality system of claim 14, wherein at least one of the processing devices generates, based at least in part on data about the neuromuscular signals, an input command that causes the head-mounted display to modify at least one additional virtual component presented proximate to the pointer within the field of view of the head-mounted display to account for the specific gesture.

16. The artificial-reality system of claim 9, wherein at least one of the processing devices:

determines, based at least in part on the angle of arrival, that the wearable is no longer visible within the field of view of the head-mounted display; and in response to determining that the wearable is no longer visible within the field of view of the head-mounted display, removing the virtual component from the field of view of the head-mounted display.

17. The artificial-reality system of claim 1, further comprising an additional wearable dimensioned to be donned on an additional body part of the user, wherein the wearable comprises:

an additional set of electrodes that detect one or more additional neuromuscular signals via the additional body part of the user; and at least one additional transmitter that transmits an additional electromagnetic signal;

wherein:

the head-mounted display is also communicatively coupled to the additional wearable, wherein the set of receivers receive the additional electromagnetic signal transmitted by the additional transmitter included on the additional wearable; and at least one of the processing devices:

determines, based at least in part on the additional neuromuscular signals detected via the additional body part of the user, that the user has made an additional gesture; and determines, based at least in part on the additional electromagnetic signal received by the set of receivers included on the head-mounted display, a position of the additional body part of the user when the user made the additional gesture.

18. The artificial-reality system of claim 17, wherein at least one of the processing devices:

calculates, based at least in part on the electromagnetic signal, at least one dimension for a position of a virtual component within a field of view of the head-mounted display;

calculates, based at least in part on the additional electromagnetic signal, at least one additional dimension for an additional position of an additional virtual component within the field of view of the head-mounted display; and simultaneously presents, within the field of view of the head-mounted display, the virtual component at the position and the additional virtual component at the additional position based at least in part on the dimension and the additional dimension.

19. A head-mounted display comprising:

a set of receivers configured to receive an electromagnetic signal that is tagged with a time stamp and is transmitted by a transmitter included on a wearable dimensioned to be donned on a body part of a user;

a radio configured to receive data about one or more neuromuscular signals detected by the wearable via the body part of the user; and at least one processing device communicatively coupled to the set of receivers and the radio, wherein the processing device:

determines, based at least in part on the data about the neuromuscular signals, that the user has made a specific gesture; and determines, based at least in part on the electromagnetic signal and the time stamp, a position of the body part of the user relative to the set of receivers when the user made the specific gesture.

20. A method comprising:

detecting, by a wearable donned on a body part of a user, one or more neuromuscular signals at the body part of the user;

emitting, by a transmitter included on the wearable, an electromagnetic signal tagged with a time stamp;

receiving, by a set of receivers included on a head-mounted display donned by the user, the electromagnetic signal emitted by the transmitter;

determining, by one or more processing devices, that the user has made a specific gesture based at least in part on the neuromuscular signals; and determining, by the one or more processing devices, a position of the body part of the user relative to the set of receivers when the user made the specific gesture based at least in part on the electromagnetic signal and the time stamp.

* * * * *